US010952127B2

(12) United States Patent
Abedini et al.

(10) Patent No.: US 10,952,127 B2
(45) Date of Patent: *Mar. 16, 2021

(54) DISCOVERY PROCEDURE SIGNALING

(71) Applicant: QUALCOMM Incorporated, San Diego, CA (US)

(72) Inventors: Navid Abedini, Somerset, NJ (US); Zhibin Wu, Sunnyvale, CA (US); Junyi Li, Chester, NJ (US); Sudhir Kumar Baghel, Hillsborough, NJ (US); Kapil Gulati, Dover, DE (US); Libin Jiang, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 16/241,787

(22) Filed: Jan. 7, 2019

(65) Prior Publication Data

US 2019/0253955 A1 Aug. 15, 2019

Related U.S. Application Data

(60) Provisional application No. 62/629,594, filed on Feb. 12, 2018.

(51) Int. Cl.
*H04W 48/10* (2009.01)
*H04L 1/00* (2006.01)
(Continued)

(52) U.S. Cl.
CPC .......... *H04W 48/10* (2013.01); *H04B 7/0695* (2013.01); *H04B 7/088* (2013.01);
(Continued)

(58) Field of Classification Search
CPC ..... H04W 48/10; H04W 48/16; H04W 8/005; H04W 40/246; H04W 4/40; H04L 1/005;
(Continued)

(56) References Cited

U.S. PATENT DOCUMENTS

2013/0157670 A1* 6/2013 Koskela ................ H04W 76/14
455/450
2017/0188391 A1 6/2017 Rajagopal et al.
(Continued)

OTHER PUBLICATIONS

International Search Report and Written Opinion—PCT/US2019/012669—ISA/EPO—dated May 22, 2019.
(Continued)

*Primary Examiner* — Ajay Cattungal
(74) *Attorney, Agent, or Firm* — Holland & Hart LLP

(57) ABSTRACT

Methods, systems, and devices for wireless communications are described. Some wireless communications systems support beamforming to improve the reliability of transmissions from a transmitting device to a receiving device. In some cases, a wireless device broadcasts information using beamforming. In such cases, in order to limit the overhead and power consumption associated with the broadcast, the wireless device utilizes the techniques described herein for broadcasting information using beamforming. In particular, rather than broadcasting large amounts of data in a beam-sweep, a wireless device broadcasts a relatively lightweight signal in a beam-sweep to first identify a receiving device and/or a suitable beam for communicating with a receiving device. Once the transmitting device identifies the receiving device and/or the suitable beam, the transmitting device broadcasts the data to be received by the receiving device.

30 Claims, 15 Drawing Sheets

(51) Int. Cl.
| | |
|---|---|
| *H04L 27/26* | (2006.01) |
| *H04L 1/16* | (2006.01) |
| *H04W 48/16* | (2009.01) |
| *H04J 13/00* | (2011.01) |
| *H04W 8/00* | (2009.01) |
| *H04W 40/24* | (2009.01) |
| *H04B 7/06* | (2006.01) |
| *H04J 11/00* | (2006.01) |
| *H04B 7/08* | (2006.01) |
| *H04W 4/40* | (2018.01) |

(52) U.S. Cl.
CPC ....... *H04J 11/0079* (2013.01); *H04J 13/0062* (2013.01); *H04L 1/005* (2013.01); *H04L 1/1692* (2013.01); *H04L 27/2692* (2013.01); *H04W 8/005* (2013.01); *H04W 40/246* (2013.01); *H04W 48/16* (2013.01); *H04W 4/40* (2018.02)

(58) Field of Classification Search
CPC ................ H04L 27/2692; H04L 1/1692; H04J 13/0062; H04J 11/0079; H04B 7/0695; H04B 7/088
See application file for complete search history.

(56) References Cited

U.S. PATENT DOCUMENTS

| | | | | |
|---|---|---|---|---|
| 2018/0092129 A1* | 3/2018 | Guo | .................... | H04W 56/001 |
| 2018/0167979 A1* | 6/2018 | Guo | ..................... | H04W 16/28 |
| 2019/0253867 A1* | 8/2019 | Abedini | ................ | H04W 8/005 |
| 2019/0253955 A1* | 8/2019 | Abedini | ................ | H04B 7/088 |
| 2019/0268748 A1* | 8/2019 | Abedini | .................. | H04W 4/46 |
| 2019/0312619 A1* | 10/2019 | Abedini | ................ | H04B 7/063 |
| 2019/0320467 A1* | 10/2019 | Freda | ................ | H04W 74/0833 |
| 2019/0387546 A1* | 12/2019 | Li | ..................... | H04W 74/0808 |

OTHER PUBLICATIONS

Partial International Search Report—PCT/US2019/012669—ISA/EPO—dated Mar. 29, 2019.

Samsung: "Random Access Procedure in NR", 3GPP TSG-RAN WG2 Meeting #94, 3GPP Draft; R2-163372_Random_Access Procedure in NR, 3rd Generation Partnership Project (3GPP), Mobile Competence Centre; 650, Route Des Lucioles; F-06921 Sophia-Antipolis Cedex; France, vol. RAN WG2, No. Nanjing, China; May 23, 2016-May 27, 2016, May 22, 2016, XP051104903, 7 Pages, Retrieved from the Internet: URL: http://www.3gpp.org/ftp/Meetings_3GPP_SYNC/RAN2/Docs/ [retrieved on May 22, 2016] pp. 1-4, Figures 1, 4.

Sony: "Discussion on Payload Content in Discovery Phase", 3GPP TSG-RAN WG2 Meeting #84, 3GPP Draft; R2-133817, 3rd Generation Partnership Project (3GPP), Mobile Competence Centre; 650, Route Des Lucioles; F-06921 Sophia-Antipolis Cedex; France, vol. RAN WG2, No. San Francisco, USA; Nov. 11, 2013-Nov. 15, 2013, Nov. 1, 2013, 3 Pages, XP050753194, Retrieved from the Internet: URL: http://www.3gpp.org/ftp/tsg_ran/WG2_RL2/TSGR2_84/Docs/ [retrieved on Nov. 1, 2013] p. 1-p. 2.

* cited by examiner

DISCOVERY PROCEDURE SIGNALING

CROSS REFERENCES

The present Application for patent claims the benefit of U.S. Provisional Patent Application No. 62/629,594 by ABEDINI, et al., entitled "DISCOVERY PROCEDURE SIGNALING," filed Feb. 12, 2018, assigned to the assignee hereof, and expressly incorporated by reference herein in its entirety.

BACKGROUND

The following relates generally to wireless communication and more specifically to discovery procedure signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some deployments (e.g., millimeter wave (mmW) deployments and some sub-6 GHz deployments), wireless devices may communicate using beamforming (e.g., directional transmission/reception) to shape or steer an antenna beam (e.g., a transmit beam or receive beam) along a spatial path. By using beamforming, wireless devices may be able to improve the chances that transmitted signals are received by a receiving device. In some cases, however, the overhead associated with transmitting signals using beamforming may be high, which may be detrimental to a wireless communications system.

SUMMARY

Some wireless communications systems may support beamforming to improve the reliability of transmissions from a transmitting device to a receiving device. In some cases, it may be appropriate for a wireless device to broadcast information using beamforming to one or more receiving devices. In such cases, in order to limit the overhead and power consumption associated with the broadcast, the wireless device may utilize the techniques described herein for broadcasting information using beamforming. In particular, rather than broadcasting large amounts of data in a beam-sweep, a wireless device may broadcast a relatively light-weight signal in a beam-sweep to first identify a receiving device and/or a suitable beam for communicating with a receiving device. Once the transmitting device identifies the receiving device and/or the suitable beam for communicating with the receiving device, the transmitting device may broadcast the data to the receiving device.

A method for wireless communication is described. The method may include generating a discovery preamble and a discovery message to broadcast in a device discovery procedure, transmitting the discovery preamble using a transmit beam as part of a beam sweeping procedure, where the discovery preamble indicates an upcoming transmission of the discovery message, receiving a signal in response to the discovery preamble or the discovery message, and transmitting the discovery message based at least in part on the transmitting the discovery preamble.

An apparatus for wireless communication is described. The apparatus may include means for generating a discovery preamble and a discovery message to broadcast in a device discovery procedure, means for transmitting the discovery preamble using a transmit beam as part of a beam sweeping procedure, where the discovery preamble indicates an upcoming transmission of the discovery message, means for receiving a signal in response to the discovery preamble or the discovery message, and means for transmitting the discovery message based at least in part on the transmitting the discovery preamble.

Another apparatus for wireless communication is described. The apparatus may include a processor, memory in electronic communication with the processor, and instructions stored in the memory. The instructions may be operable to cause the processor to generate a discovery preamble and a discovery message to broadcast in a device discovery procedure, transmit the discovery preamble using a transmit beam as part of a beam sweeping procedure, where the discovery preamble indicates an upcoming transmission of the discovery message, receive a signal in response to the discovery preamble or the discovery message, and transmit the discovery message based at least in part on the transmitting the discovery preamble.

A non-transitory computer-readable medium for wireless communication is described. The non-transitory computer-readable medium may include instructions operable to cause a processor to generate a discovery preamble and a discovery message to broadcast in a device discovery procedure, transmit the discovery preamble using a transmit beam as part of a beam sweeping procedure, where the discovery preamble indicates an upcoming transmission of the discovery message, receive a signal in response to the discovery preamble or the discovery message, and transmit the discovery message based at least in part on the transmitting the discovery preamble.

In some examples of the method, apparatus, and non-transitory computer-readable medium described above, a first frequency of discovery preamble transmissions may be greater than a second frequency of discovery message transmissions. In some examples of the method, apparatus, and non-transitory computer-readable medium described above, receiving the signal includes receiving a query signal in response to the discovery preamble, where the discovery message may be transmitted based at least in part on receiving the query signal. In some examples of the method, apparatus, and non-transitory computer-readable medium described above, receiving the signal includes receiving an acknowledgment signal in response to the discovery message, where the acknowledgment signal acknowledges receipt of the discovery message. Some examples of the method, apparatus, and non-transitory computer-readable medium described above may further include processes, features, means, or instructions for terminating the beam sweeping procedure based at least in part on receiving the signal.

In some examples of the method, apparatus, and non-transitory computer-readable medium described above, transmitting the discovery preamble using the transmit beam includes transmitting a first plurality of discovery preambles using a first transmit beam in a first transmission burst and transmitting a second plurality of discovery preambles using a second transmit beam in a second transmission burst. In some examples of the method, apparatus, and non-transitory computer-readable medium described above, receiving the signal includes receiving a query signal in response to a discovery preamble in the first or second plurality of discovery preambles transmitted using the first or second transmit beam.

Some examples of the method, apparatus, and non-transitory computer-readable medium described above may further include processes, features, means, or instructions for adjusting the beam sweeping procedure for subsequent transmissions of discovery preambles and discovery messages based at least in part on receiving the signal. Some examples of the method, apparatus, and non-transitory computer-readable medium described above may further include processes, features, means, or instructions for determining to use the first or second transmit beam for transmitting the discovery message based at least in part on the receiving and transmitting the discovery message using the first or second transmit beam. Some examples of the method, apparatus, and non-transitory computer-readable medium described above may further include processes, features, means, or instructions for transmitting a first discovery message using the first transmit beam after the first transmission burst and transmitting a second discovery message using the second transmit beam after the second transmission burst.

In some examples of the method, apparatus, and non-transitory computer-readable medium described above, receiving the signal includes receiving an acknowledgment signal in response to the first or second discovery message, where the acknowledgment signal acknowledges receipt of the first or second discovery message. Some examples of the method, apparatus, and non-transitory computer-readable medium described above may further include processes, features, means, or instructions for configuring subsequent communications based at least in part on receiving the acknowledgment signal. In some examples of the method, apparatus, and non-transitory computer-readable medium described above, transmitting the discovery preamble using the transmit beam includes transmitting a first plurality of discovery preambles using a plurality of transmit beams in a first transmission burst and transmitting a second plurality of discovery preambles using the plurality of transmit beams in a second transmission burst.

Some examples of the method, apparatus, and non-transitory computer-readable medium described above may further include processes, features, means, or instructions for identifying a first set of resources and configurations for transmitting the discovery preamble, a second set of resources and configurations for transmitting the discovery message, and a third set of resources and configurations for receiving the signal. In some examples of the method, apparatus, and non-transitory computer-readable medium described above, identifying the first set of resources and configurations, the second set of resources and configurations, and the third set of resources and configurations includes receiving an indication of the first set of resources and configurations for transmitting the discovery preamble, the second set of resources and configurations for transmitting the discovery message, and the third set of resources and configurations for receiving the signal.

In some examples of the method, apparatus, and non-transitory computer-readable medium described above, the first set of resources and configurations used for transmitting the discovery preamble, the second set of resources and configurations used for transmitting the discovery message, and the third set of resources and configurations used for receiving the signal may be predefined. In some examples of the method, apparatus, and non-transitory computer-readable medium described above, the second set of resources and configurations used for transmitting the discovery message may be identified based at least in part on the first set of resources and configurations used for transmitting the discovery preamble.

In some examples of the method, apparatus, and non-transitory computer-readable medium described above, the signal may be received in response to the discovery preamble, and the third set of resources and configurations used for receiving the signal may be identified based at least in part on the first set of resources and configurations used for transmitting the discovery preamble. In some examples of the method, apparatus, and non-transitory computer-readable medium described above, the second set of resources and configurations used for transmitting the discovery message may be identified based at least in part on the third set of resources and configurations used for receiving the signal.

In some examples of the method, apparatus, and non-transitory computer-readable medium described above, the second set of resources and configurations used for transmitting the discovery message may be identified based at least in part on receiving the signal. In some examples of the method, apparatus, and non-transitory computer-readable medium described above, the signal may be received in response to the discovery message, and the third set of resources and configurations used for receiving the signal may be identified based at least in part on the first set of resources and configurations used for transmitting the discovery preamble or the second set of resources and configurations used for transmitting the discovery message.

In some examples of the method, apparatus, and non-transitory computer-readable medium described above, the discovery preamble includes a preamble of a discovery message in a vehicle-to-everything (V2X) device discovery procedure, and the discovery message includes information for identifying a device in the V2X device discovery procedure. In some examples of the method, apparatus, and non-transitory computer-readable medium described above, the discovery preamble includes a reference signal and the discovery message includes system information. In some examples of the method, apparatus, and non-transitory computer-readable medium described above, the signal includes a Zadoff-Chu sequence, a pseudo-noise sequence, or a maximum length sequence. In some examples of the method, apparatus, and non-transitory computer-readable medium described above, the signal includes a static message used by a plurality of devices. In some examples of the method, apparatus, and non-transitory computer-readable medium described above, the signal includes an indication of an identity, schedule, capability, state, or discovery mode of a receiving device.

A method for wireless communication is described. The method may include monitoring for a plurality of discovery preambles using a plurality of receive beams as part of a beam sweeping procedure, receiving a discovery preamble of the plurality of discovery preambles using a receive beam of the plurality of receive beams based at least in part on the monitoring, where the discovery preamble indicates an upcoming transmission of a discovery message, receiving the discovery message using the receive beam, and transmitting a signal in response to the discovery preamble or the discovery message using a transmit beam corresponding to the receive beam.

An apparatus for wireless communication is described. The apparatus may include means for monitoring for a plurality of discovery preambles using a plurality of receive beams as part of a beam sweeping procedure, means for receiving a discovery preamble of the plurality of discovery preambles using a receive beam of the plurality of receive beams based at least in part on the monitoring, where the discovery preamble indicates an upcoming transmission of a discovery message, means for receiving the discovery message using the receive beam, and means for transmitting a signal in response to the discovery preamble or the discovery message using a transmit beam corresponding to the receive beam.

Another apparatus for wireless communication is described. The apparatus may include a processor, memory in electronic communication with the processor, and instructions stored in the memory. The instructions may be operable to cause the processor to monitor for a plurality of discovery preambles using a plurality of receive beams as part of a beam sweeping procedure, receive a discovery preamble of the plurality of discovery preambles using a receive beam of the plurality of receive beams based at least in part on the monitoring, where the discovery preamble indicates an upcoming transmission of a discovery message, receive the discovery message using the receive beam, and transmit a signal in response to the discovery preamble or the discovery message using a transmit beam corresponding to the receive beam.

A non-transitory computer-readable medium for wireless communication is described. The non-transitory computer-readable medium may include instructions operable to cause a processor to monitor for a plurality of discovery preambles using a plurality of receive beams as part of a beam sweeping procedure, receive a discovery preamble of the plurality of discovery preambles using a receive beam of the plurality of receive beams based at least in part on the monitoring, where the discovery preamble indicates an upcoming transmission of a discovery message, receive the discovery message using the receive beam, and transmit a signal in response to the discovery preamble or the discovery message using a transmit beam corresponding to the receive beam.

In some examples of the method, apparatus, and non-transitory computer-readable medium described above, a first frequency of discovery preamble transmissions may be greater than a second frequency of discovery message transmissions. In some examples of the method, apparatus, and non-transitory computer-readable medium described above, transmitting the signal includes transmitting a query signal in response to the discovery preamble, where the discovery message may be received based at least in part on transmitting the query signal. In some examples of the method, apparatus, and non-transitory computer-readable medium described above, transmitting the signal includes transmitting an acknowledgment signal in response to the discovery message, where the acknowledgment signal acknowledges receipt of the discovery message.

Some examples of the method, apparatus, and non-transitory computer-readable medium described above may further include processes, features, means, or instructions for terminating the beam sweeping procedure based at least in part on transmitting the acknowledgment signal. Some examples of the method, apparatus, and non-transitory computer-readable medium described above may further include processes, features, means, or instructions for adjusting the beam sweeping procedure for subsequent receptions of discovery preambles and discovery messages based at least in part on the acknowledgment signal. Some examples of the method, apparatus, and non-transitory computer-readable medium described above may further include processes, features, means, or instructions for configuring subsequent communications based at least in part on the acknowledgment signal.

Some examples of the method, apparatus, and non-transitory computer-readable medium described above may further include processes, features, means, or instructions for monitoring for a first plurality of discovery preambles using a plurality of receive beams in a first transmission burst, where each discovery preamble in the first plurality of discovery preambles may be transmitted using a first transmit beam. Some examples of the method, apparatus, and non-transitory computer-readable medium described above may further include processes, features, means, or instructions for monitoring for a second plurality of discovery preambles using the plurality of receive beams in a second transmission burst, where each discovery preamble in the second plurality of discovery preambles may be transmitted using a second transmit beam.

Some examples of the method, apparatus, and non-transitory computer-readable medium described above may further include processes, features, means, or instructions for identifying a first receive beam of the plurality of receive beams for receiving a first discovery message after the first transmission burst, where the first receive beam may be identified based at least in part on monitoring for the first plurality of discovery preambles using the plurality of receive beams. Some examples of the method, apparatus, and non-transitory computer-readable medium described above may further include processes, features, means, or instructions for receiving the first discovery message after the first transmission burst using the first receive beam. Some examples of the method, apparatus, and non-transitory computer-readable medium described above may further include processes, features, means, or instructions for determining that a quality of the first discovery message may be below a signal quality threshold and avoiding transmitting an acknowledgment signal in response to the first discovery message.

Some examples of the method, apparatus, and non-transitory computer-readable medium described above may further include processes, features, means, or instructions for identifying a second receive beam of the plurality of receive beams for receiving a second discovery message after the second transmission burst, where the second receive beam may be identified based at least in part on monitoring for the second plurality of discovery preambles using the plurality of receive beams. Some examples of the method, apparatus, and non-transitory computer-readable medium described above may further include processes, features, means, or instructions for receiving the second discovery message after the second transmission burst using the second receive beam. Some examples of the method, apparatus, and non-transitory computer-readable medium described above may further include processes, features, means, or instructions for determining that a quality of the second discovery message may be above a signal quality threshold and transmitting an acknowledgment signal in response to the second discovery message, where the acknowledgment signal acknowledges receipt of the second discovery message.

Some examples of the method, apparatus, and non-transitory computer-readable medium described above may further include processes, features, means, or instructions for monitoring for a first plurality of discovery preambles using a first receive beam in a first transmission burst, where the first plurality of discovery preambles may be transmitted using a plurality of transmit beams. Some examples of the method, apparatus, and non-transitory computer-readable medium described above may further include processes, features, means, or instructions for monitoring for a second plurality of discovery preambles using a second receive beam in a second transmission burst, where the second plurality of discovery preambles may be transmitted using the plurality of transmit beams.

Some examples of the method, apparatus, and non-transitory computer-readable medium described above may further include processes, features, means, or instructions for identifying timing information based at least in part on the discovery preamble, where the signal may be transmitted based at least in part on the timing information. Some examples of the method, apparatus, and non-transitory computer-readable medium described above may further include processes, features, means, or instructions for identifying a receive power of the discovery preamble, determining a transmit power for transmitting the signal based at least in part on the receive power, and transmitting the signal using the transmit power.

Some examples of the method, apparatus, and non-transitory computer-readable medium described above may further include processes, features, means, or instructions for identifying a first set of resources and configurations for monitoring for the plurality of discovery preambles, a second set of resources and configurations for monitoring for the discovery message, and a third set of resources and configurations for transmitting the signal. In some examples of the method, apparatus, and non-transitory computer-readable medium described above, identifying the first set of resources and configurations, the second set of resources and configurations, and the third set of resources and configurations includes receiving an indication of the first set of resources and configurations for monitoring for the plurality of discovery preambles, the second set of resources and configurations for monitoring for the discovery message, and the third set of resources and configurations for transmitting the signal.

In some examples of the method, apparatus, and non-transitory computer-readable medium described above, the first set of resources and configurations for monitoring for the plurality of discovery preambles, the second set of resources and configurations for monitoring for the discovery message, and the third set of resources and configurations for transmitting the signal may be predefined. In some examples of the method, apparatus, and non-transitory computer-readable medium described above, the second set of resources and configurations used for monitoring for the discovery message may be identified based at least in part on the first set of resources and configurations used for monitoring for the plurality of discovery preambles.

In some examples of the method, apparatus, and non-transitory computer-readable medium described above, the signal may be transmitted in response to the discovery preamble, and the third set of resources and configurations used for transmitting the signal may be identified based at least in part on the first set of resources and configurations used for monitoring for the plurality of discovery preambles. In some examples of the method, apparatus, and non-transitory computer-readable medium described above, the second set of resources and configurations used for monitoring for the discovery message may be identified based at least in part on the third set of resources and configurations used for transmitting the signal.

In some examples of the method, apparatus, and non-transitory computer-readable medium described above, the second set of resources and configurations used for monitoring for the discovery message may be identified based at least in part on transmitting the signal. In some examples of the method, apparatus, and non-transitory computer-readable medium described above, the signal may be received in response to the discovery message, and the third set of resources and configurations used for transmitting the signal may be identified based at least in part on the first set of resources and configurations used for monitoring for the plurality of discovery preambles or the second set of resources and configurations used for monitoring for the discovery message.

In some examples of the method, apparatus, and non-transitory computer-readable medium described above, the discovery preamble includes a preamble of a discovery message in a V2X device discovery procedure, and the discovery message includes information for identifying a device in the V2X device discovery procedure. In some examples of the method, apparatus, and non-transitory computer-readable medium described above, the discovery preamble includes a reference signal and the discovery message includes system information. In some examples of the method, apparatus, and non-transitory computer-readable medium described above, the signal includes a Zadoff-Chu sequence, a pseudo-noise sequence, or a maximum length sequence. In some examples of the method, apparatus, and non-transitory computer-readable medium described above, the signal includes a static message used by a plurality of devices. In some examples of the method, apparatus, and non-transitory computer-readable medium described above, the signal includes an indication of an identity, schedule, capability, state, or discovery mode of a transmitting device.

DETAILED DESCRIPTION

Figure 1:
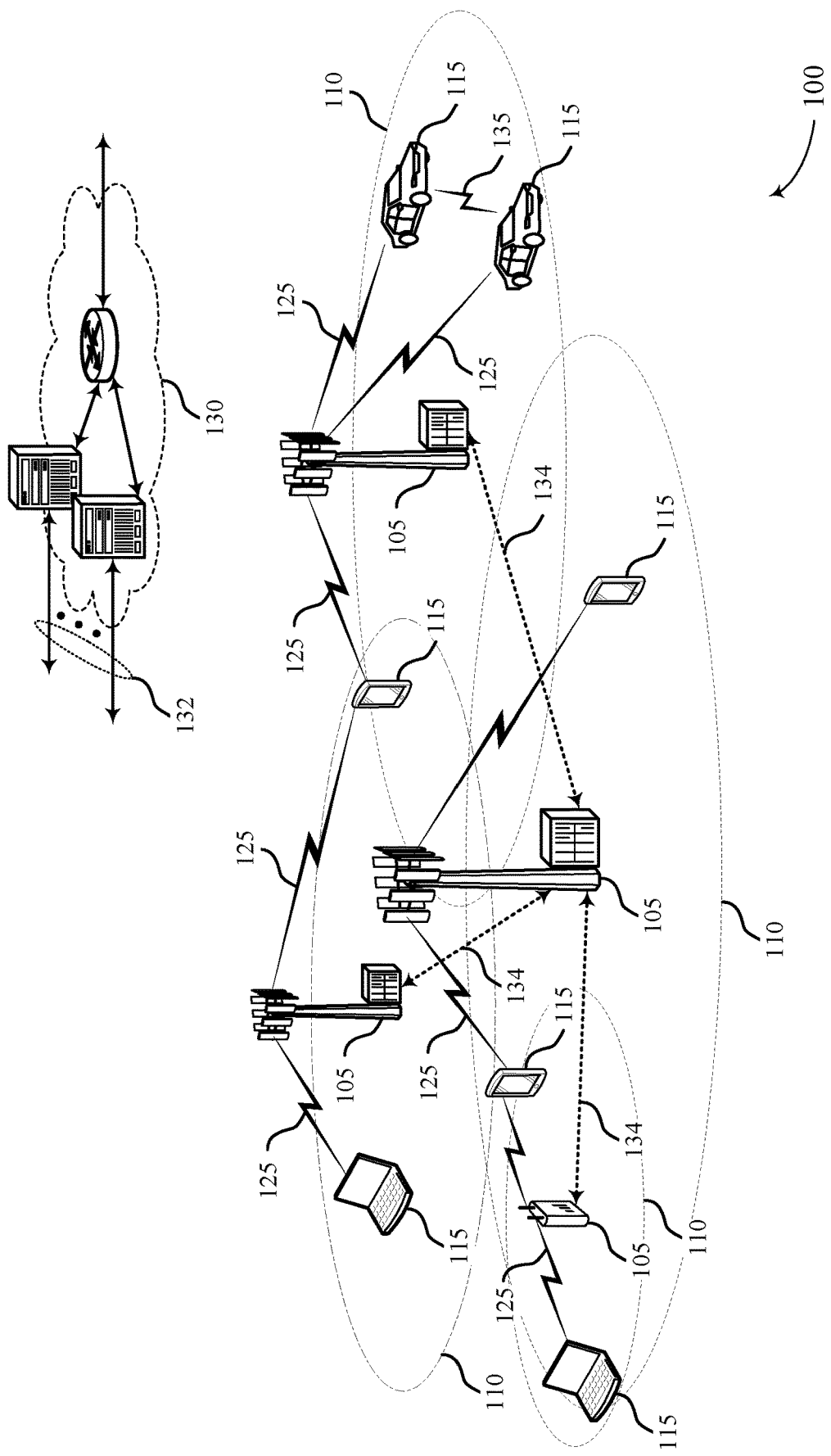
FIGS. 1 and 2 illustrate examples of wireless communications systems that support discovery procedure signaling in accordance with aspects of the present disclosure.

Some wireless communications systems may support beamforming to improve the reliability of transmissions from a transmitting device to a receiving device (e.g., in millimeter wave (mmW) deployments). In such systems, a transmitting device may use multiple antennas or antenna arrays to conduct beamforming operations for directional communications with a receiving device. In some aspects, it may be appropriate for a transmitting device to utilize beamforming to broadcast a large amount of data to one or more receiving devices. For example, it may be appropriate for a user equipment (UE) in a wireless communications system to broadcast a discovery message to identify other UEs in the wireless communications system (e.g., in a device discovery procedure for vehicle-to-everything (V2X) communications). Similarly, in another example, it may be appropriate for a base station to broadcast system information in a wireless communications system to enable one or more UEs to gain access to the system (e.g., in an initial access procedure).

In some cases, in order for a transmitting device to cover an appropriate angular region for a broadcast transmission using beamforming, the transmitting device may broadcast the data multiple times in different directions. Accordingly, a large amount of resources may be allocated to the transmitting device for the broadcast transmission, resulting in high overhead in a wireless communications system. Further, the amount of power consumed at a transmitting device for transmitting the broadcast transmission using beamforming and the amount of power consumed at a receiving device for processing the received broadcast transmission (e.g., blind decoding a channel in the large amount of resources allocated for the broadcast transmission) may be high. In addition to these inefficiencies, because the broadcast transmission may not be received by an intended receiver (e.g., when no receiver is present in the beam-swept directions), the resources and power used for the broadcast transmission may be wasted.

As described herein, a wireless device may support efficient techniques for limiting the overhead and power consumption associated with broadcasting a large amount of data using beamforming. In particular, a transmitting device (e.g., a UE or a base station) may support techniques for broadcasting a relatively lightweight signal (e.g., a discovery preamble) in a beam-sweep to first identify a receiving device and/or a suitable beam for communicating with a receiving device. Once the transmitting device identifies a receiving device or identifies the beam for communicating with a receiving device, the transmitting device may broadcast the data (e.g., in a discovery message). Using these techniques, the transmitting device may avoid broadcasting large amounts of data frequently, resulting in reduced overhead in a wireless communications system and reduced power consumption at transmitting and receiving devices.

Aspects of the disclosure introduced above are described below in the context of a wireless communications system. Examples of processes and signaling exchanges that support discovery procedure signaling are then described. Aspects of the disclosure are further illustrated by and described with reference to apparatus diagrams, system diagrams, and flowcharts that relate to discovery procedure signaling.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Wireless communications system 100 may support direct communication between UEs 115 over a sidelink 135 (e.g., using a peer-to-peer (P2P) or device-to-device (D2D) protocol). Sidelink communication may be used for D2D media-sharing, vehicle-to-vehicle (V2V) communication, V2X communication (or cellular V2X (cV2X) communication), emergency rescue applications, etc. One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Time intervals of a communications resource in LTE or NR may be organized according to radio frames each having a duration of 10 milliseconds (ms). The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some cases, the numerology employed within a system (i.e., subcarrier size, symbol-period duration, and/or TTI duration) may be selected or determined based on a type of communication. The numerology may be selected or determined in view of an inherent tradeoff between latency for low latency applications and efficiency for other applications, for example. In some cases, a resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. Resource blocks may be defined according to other numerologies in various examples.

Wireless communications system 100 may operate in an extremely-high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than ultra-high frequency (UHF) antennas. In some cases, this may facilitate use of antenna arrays within a UE 115. However, the propagation of EHF transmissions may be subject to even greater atmospheric attenuation and shorter range than super-high frequency (SHF) or UHF transmissions. Techniques disclosed herein may be employed across transmissions that use one or more different frequency regions, and designated use of bands across these frequency regions may differ by country or regulating body.

Beamforming, which may also be referred to as spatial filtering, directional transmission, or directional reception, is a signal processing technique that may be used at a transmitting device or a receiving device in wireless communications system 100 (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device.

Wireless communications system 100 may support beamforming to, for example, overcome the large path loss associated with communications at higher frequencies (e.g., in mmW deployments). A transmitting device in wireless communications system 100 may use multiple antennas or antenna arrays to conduct beamforming operations for directional communications with a receiving device. In some aspects, it may be appropriate for a transmitting device to utilize beamforming to broadcast a large amount of data to one or more receiving devices. In one example, it may be appropriate for a UE 115 to broadcast a discovery message via a physical sidelink discovery channel (PSDCH) to identify other UEs in wireless communications system 100 (e.g., in a device discovery procedure for V2X communications). In another example, it may be appropriate for a base station 105 to broadcast system information to enable one or more UEs to gain access to wireless communications system 100 (e.g., in an initial access procedure).

In some cases, in order for a transmitting device to cover an appropriate angular region for a broadcast transmission, the transmitting device may broadcast the data multiple times in different directions. Accordingly, a large amount of resources may be allocated to the transmitting device for the broadcast transmission, resulting in high overhead in wireless communications system 100. Further, because the broadcast transmission may not be received by an intended receiver (e.g., when no receiver is present in the beam-swept directions), the resources and power used for the broadcast transmission may be wasted. Wireless devices in wireless communications system 100 may support efficient techniques for limiting the amount of resources and power used for beamformed broadcast transmissions to improve spectral efficiency and power efficiency in wireless communications system 100.

Figure 2:
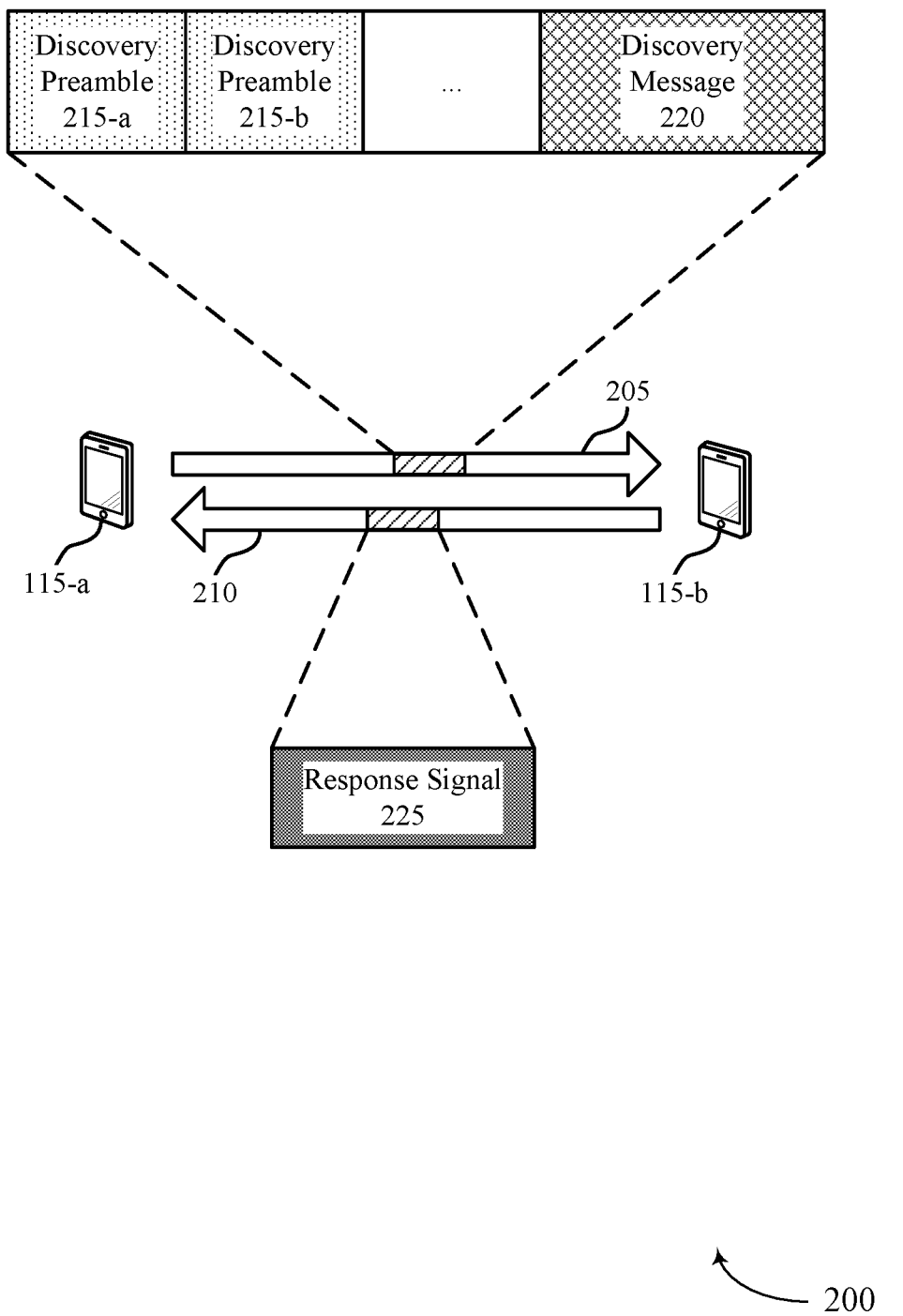

FIG. 2 illustrates an example of a wireless communications system 200 that supports discovery procedure signaling in accordance with various aspects of the present disclosure. Wireless communications system 200 includes UE 115-a and UE 115-b, which may be examples of a UE 115 described with reference to FIG. 1. UE 115-a may communicate with UE 115-b on resources of a carrier 205 or a carrier 210. Although FIG. 2 illustrates communications between a UE 115-a and a UE 115-b (e.g., for discovery signaling in a device-discovery procedure for V2X communications), it is to be understood that the techniques described herein may be applicable to communications between a base station and a UE (e.g., for discovery signaling in an initial access procedure).

Wireless communications system 200 may implement aspects of wireless communications system 100. For example, UEs 115 in wireless communications system 200 may support efficient techniques for limiting the amount of resources and power used for beamformed broadcast transmissions. In particular, instead of broadcasting a discovery message 220 multiple times in a beam sweep such that the discovery message 220 may be received by a receiving device, UE 115-a may transmit a discovery preamble 215 in a beam sweep to first identify a receiving device or identify a suitable beam for communicating with a receiving device. In the example of FIG. 2, UE 115-b may receive the discovery preamble 215 and may identify a suitable beam for communicating with UE 115-a. In some cases, UE 115-b may then transmit a signal 225 in response to the discovery preamble 215 (e.g., a query signal requesting or triggering the transmission of the discovery message 220).

Once UE 115-a identifies a receiving UE (e.g., based on receiving a query signal), UE 115-a may broadcast the discovery message 220 to be received by the receiving UE. Alternatively, once UE 115-a transmits sufficient discovery preambles 215 in a beam sweeping procedure to enable a receiving UE to identify a suitable beam for receiving the discovery message 220, UE 115-a may broadcast the discovery message 220 to be received by the receiving UE (e.g., UE 115-b). Because UE 115-a may broadcast the discovery message only after UE 115-a identifies a receiving UE or after receiving devices in wireless communications system 200 are able to identify a suitable beam for receiving the discovery message 220, the frequency of discovery message transmissions in wireless communications system 200 may be reduced.

As a result, using the techniques described herein, the overhead associated with broadcasting data (e.g., a large amount of data) using beamforming may be reduced. At the same time, since the discovery preambles may be broadcast in a beam-sweep as part of a beam sweeping procedure, UE 115-a may still effectively cover an appropriate angular region for a broadcast transmission to enable a wide range of UEs in wireless communications system 200 to identify beams for receiving the discovery message 220 from UE 115-a. Further, because UE 115-a and UE 115-b may perform a beam sweeping procedure using a simpler signal (i.e., the discovery preamble 215 instead of the discovery message 220), UE 115-a may use less power for the beam sweeping procedure, and UE 115-b may use less power to process the signal in the beam sweeping procedure, resulting in more efficient operations at UE 115-a and UE 115-b.

Figure 3:
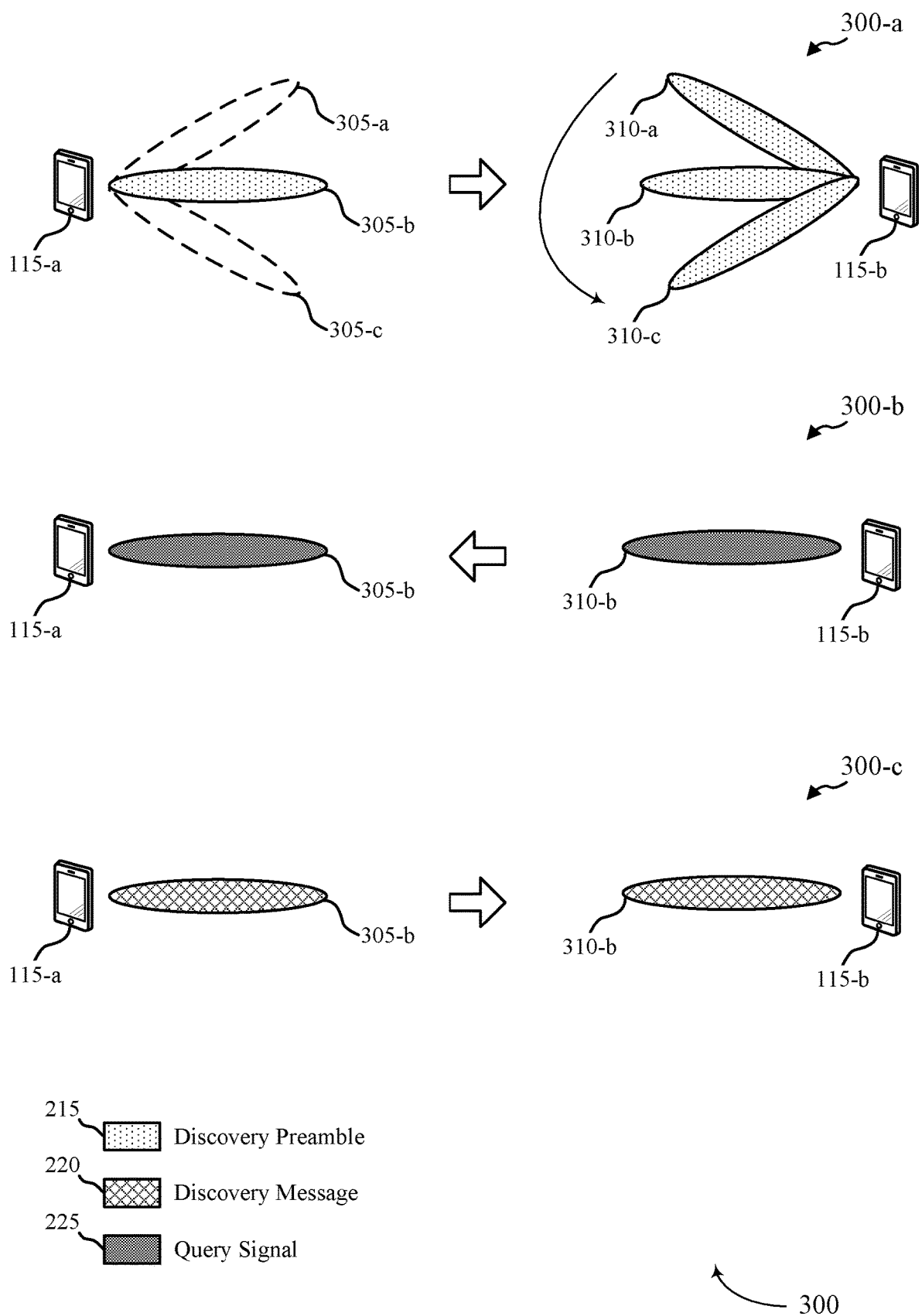
FIGS. 3-5 illustrate examples of beam sweeping procedures for discovery signaling in accordance with aspects of the present disclosure.
Figure 4:
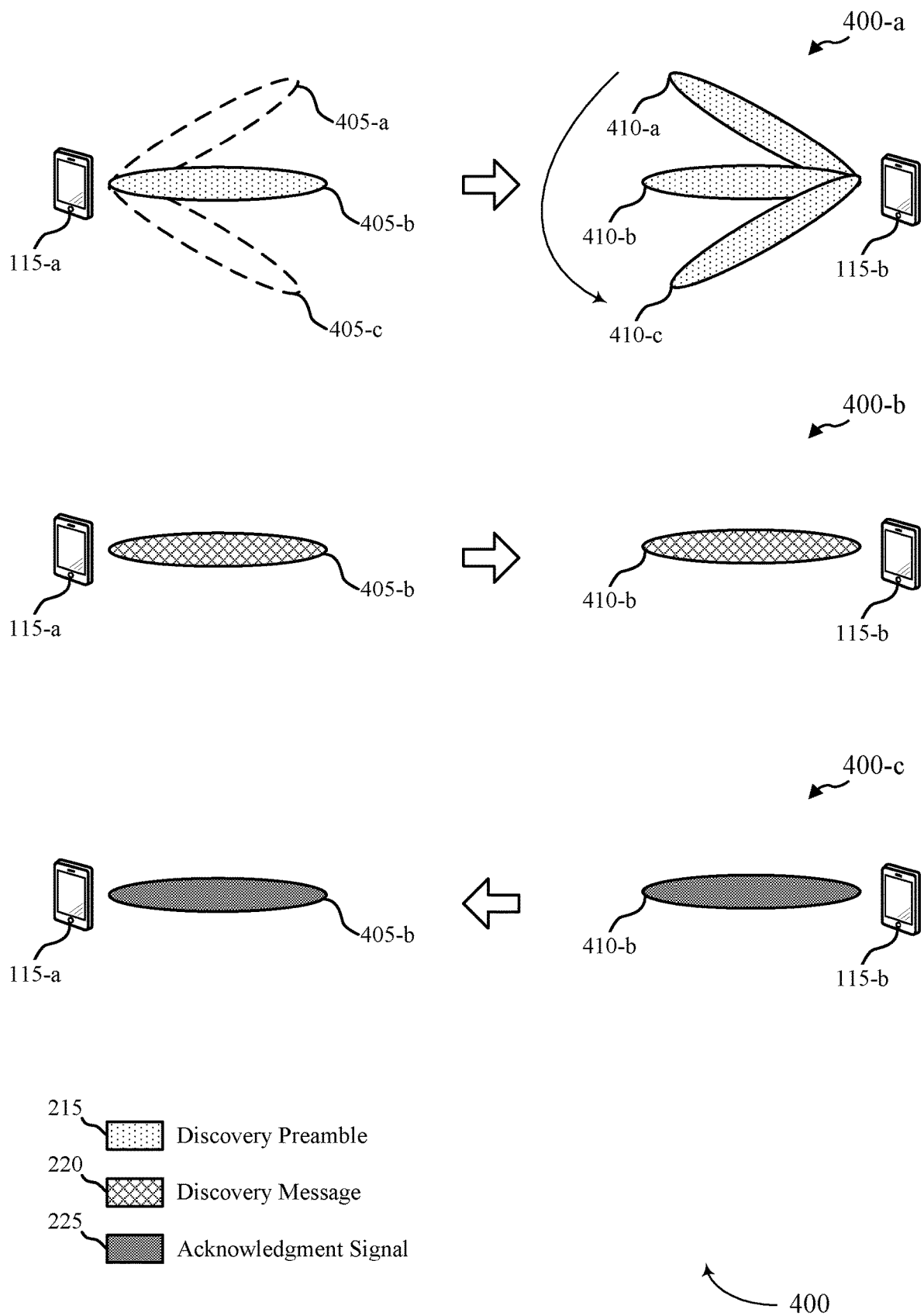
Figure 5:
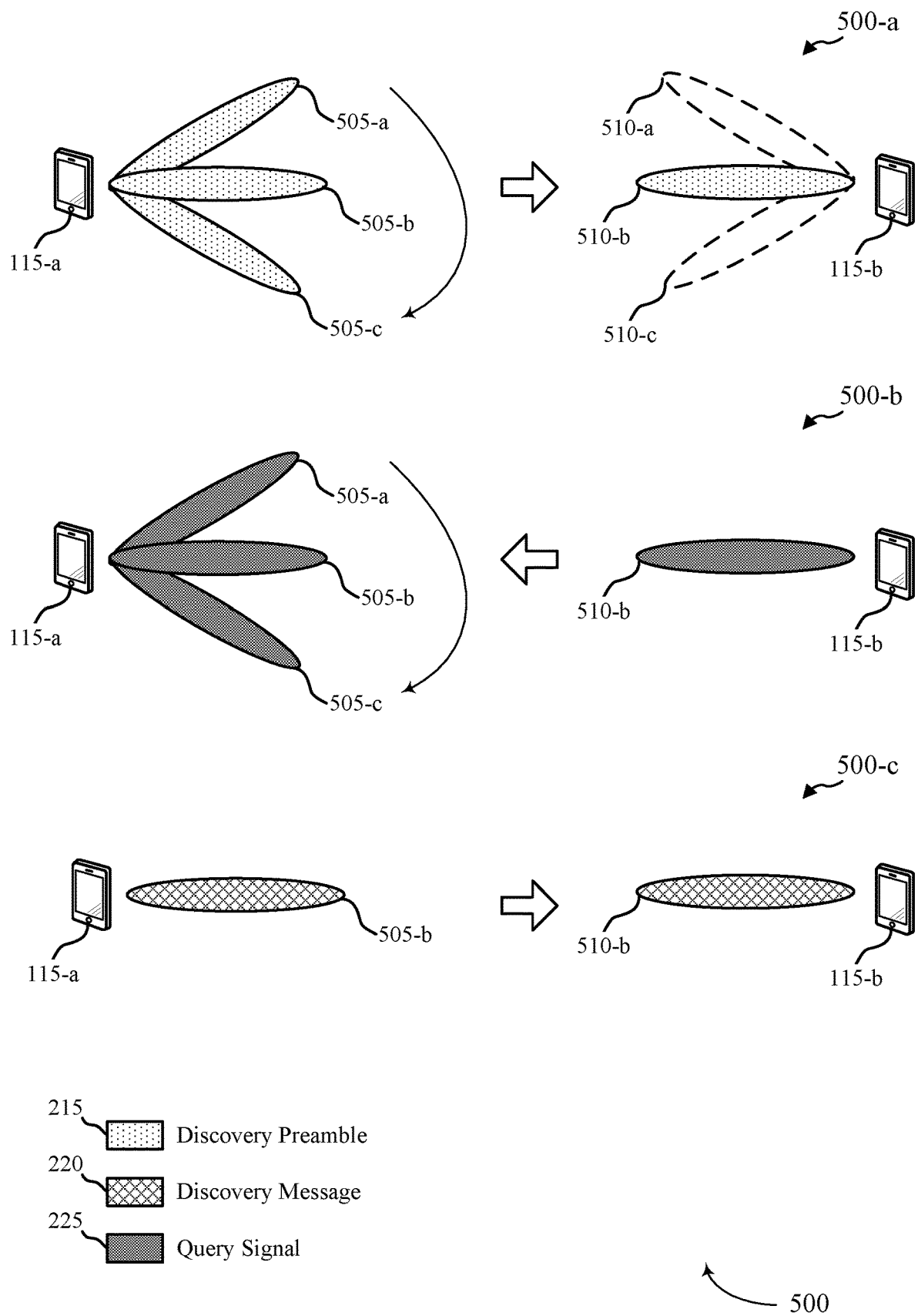

In some cases, after receiving the discovery message, UE 115-b may transmit a response signal 225 (e.g., an acknowledgment signal) to UE 115-a to acknowledge receipt of the discovery message 220. Thus, in the example of FIG. 2, the response signal 225 may be a query signal, an acknowledgment signal, or both. In such cases, after UE 115-b transmits the acknowledgment signal, UE 115-b may terminate a beam sweeping procedure used for monitoring for discovery preambles from UE 115-a, and after UE 115-a receives the acknowledgment signal, UE 115-a may terminate a beam sweeping procedure used for transmitting discovery preambles to UE 115-b. FIGS. 3-5 illustrate different examples of the beam sweeping procedures described above where UE 115-a may transmit multiple discovery preambles using multiple transmit beams and UE 115-b may monitor for the discovery preambles using multiple receive beams.

In the example of FIG. 3, UE 115-a may broadcast discovery preambles 215 in a beam sweeping procedure to identify an appropriate beam for transmitting a discovery message 220 to UE 115-b and to allow UE 115-b to identify an appropriate beam for receiving the discovery message from UE 115-a (i.e., the discovery preambles may be used to identify a suitable beam pair link (BPL)). In this example, UE 115-a may generate multiple discovery preambles 215 to transmit using each of its transmit beams, and UE 115-b may monitor for the discovery preambles 215 from UE 115-a using its receive beams. UE 115-a may broadcast multiple discovery preambles 215 in a transmission burst using a single transmit beam to allow one or more receiving devices to perform a receive beam sweep to identify a suitable beam for receiving the discovery message 220 from UE 115-a.

In a first transmission burst (as illustrated in 300-a), UE 115-a may broadcast M discovery preambles 215 using a first transmit beam 305-a, where M corresponds to the number of receive beams available to receiving UEs (e.g., UE 115-b) in a wireless communications system. UE 115-b may monitor for the discovery preambles 215 transmitted using the first transmit beam 305-*a*, and UE 115-*b* may attempt to receive each of the M discovery preambles 215 using a different receive beam 310. In the example of FIG. 3, UE 115-*b* may fail to receive the discovery preambles 215 using each of the receive beams 310 or UE 115-*b* may determine that the quality of each of the discovery preambles 215 received in the first transmission burst is below a signal quality threshold. Thus, UE 115-*b* may avoid transmitting a query signal to UE 115-*a* to request or trigger a transmission of the discovery message 220.

In a second transmission burst (as illustrated in 300-*a*), UE 115-*a* may broadcast the M discovery preambles 215 using a second transmit beam 305-*b*. UE 115-*b* may monitor for the discovery preambles 215 transmitted using the second transmit beam 305-*b*, and UE 115-*b* may attempt to receive each of the M discovery preambles 215 using a different receive beam 310. In this case, UE 115-*b* may successfully receive a discovery preamble 215 of the M discovery preambles 215 using a second receive beam 310-*b*, and UE 115-*a* may determine that the quality of the received discovery preamble 215 is above a signal quality threshold. Thus, UE 115-*b* may identify beam 310-*b* as a suitable beam for receiving the discovery message 220, and UE 115-*b* may terminate a beam sweeping procedure and avoid monitoring for additional discovery preambles 215 from UE 115-*a*.

After identifying beam 310-*b* as a suitable beam for communicating with UE 115-*a*, UE 115-*b* may transmit a query signal 225 to UE 115-*a* to request or trigger a transmission of the discovery message 220 (as illustrated in 300-*b*). UE 115-*b* may transmit the query signal 225 using the same beam (i.e., beam 310-*b*) used to successfully receive the discovery preamble 215. Further, since the query signal 225 may be received by UE 115-*a* after the second transmission burst, UE 115-*a* may receive the query signal 225 using the same beam used to transmit the discovery preamble 215 that was successfully received by UE 115-*b*. Thus, the beam used for the discovery preamble transmission (i.e., beam 305-*b* at UE 115-*a* and beam 310-*b* at UE 115-*b*) may be reciprocally spatially quasi-located with the beam used for the query signal transmission (i.e., beam 305-*b* at UE 115-*a* and beam 310-*b* at UE 115-*b*).

UE 115-*a* may then receive the query signal 225 from UE 115-*b*, and UE 115-*a* may terminate the beam sweeping procedure and avoid broadcasting additional discovery preambles 215. For instance, UE 115-*a* may avoid transmitting discovery preambles 215 using transmit beam 305-*c* after identifying a suitable beam for transmitting the discovery message 220 to UE 115-*b*. UE 115-*b* may then broadcast the discovery message 220 using the identified beam (as illustrated in 300-*c*), and UE 115-*b* may receive the discovery message 220 using the identified beam. In this case, UE 115-*a* may transmit the discovery message 220 using the same transmit beam used to transmit the discovery preamble 215 that was successfully received by UE 115-*b*, and UE 115-*b* may receive the discovery message 220 using the same receive beam used to successfully receive the discovery preamble 215 from UE 115-*a*. Thus, the beam used for the discovery preamble transmission may be spatially quasi co-located with the beam used for the discovery message transmission.

In the example of FIG. 4, UE 115-*a* may broadcast discovery preambles 215 in a beam sweeping procedure to identify an appropriate transmit beam for transmitting a discovery message 220 to UE 115-*b* and to allow UE 115-*b* to identify an appropriate receive beam for receiving the discovery message 220 from UE 115-*a* (i.e., the discovery preambles may be used to identify a suitable BPL). In this example, UE 115-*a* may generate multiple discovery preambles 215 to transmit using each of its transmit beams, and UE 115-*b* may monitor for the discovery preambles 215 from UE 115-*a* using its receive beams. UE 115-*a* may broadcast multiple discovery preambles 215 in a transmission burst using a single transmit beam to allow one or more receiving devices to perform a receive beam sweep to identify a suitable beam for receiving the discovery message 220 from UE 115-*a*.

In a first transmission burst (illustrated in 400-*a*), UE 115-*a* may broadcast M discovery preambles 215 using a first transmit beam 405-*a*, where M corresponds to the number of receive beams available to receiving UEs (e.g., UE 115-*b*) in a wireless communications system. UE 115-*b* may monitor for the discovery preambles 215 transmitted using the first transmit beam 405-*a*, and UE 115-*b* may attempt to receive each of the M discovery preambles 215 using a different receive beam 410. UE 115-*b* may then identify the receive beam of the receive beams 410 associated with the highest signal quality based on discovery preamble transmissions, and UE 115-*b* may determine to receive a subsequent discovery message 220 from UE 115-*a* using the identified receive beam.

After the first transmission burst in the beam sweeping procedure, UE 115-*a* may transmit a discovery message 220 using the first transmit beam 405-*a*, and UE 115-*b* may attempt to receive the discovery message 220 using the identified receive beam. In some cases, UE 115-*b* may fail to receive the discovery message 220 transmitted using transmit beam 405-*a*. In other cases, UE 115-*b* may receive the discovery message 220 and determine that the quality of the discovery message 220 is below a signal quality threshold. In yet other cases, UE 115-*a* may successfully receive the discovery message and determine not to pursue further communications with UE 115-*a* based on information acquired from the discovery message 220. In any of these cases, UE 115-*b* may avoid transmitting an acknowledgment signal to UE 115-*a* to acknowledge receipt of the discovery message 220. Thus, UE 115-*b* may determine to continue performing a beam sweeping procedure to identify a suitable beam for receiving a discovery message 220 from UE 115-*a* or to receive another discovery message.

Accordingly, in a second transmission burst (illustrated in 400-*a*), UE 115-*a* may broadcast the M discovery preambles 215 using a second transmit beam 405-*b*. UE 115-*b* may monitor for the discovery preambles 215 transmitted using the second transmit beam 405-*b*, and UE 115-*b* may attempt to receive each of the M discovery preambles 215 using a different receive beam 410. UE 115-*b* may then identify the receive beam of the receive beams 410 associated with the highest signal quality based on the discovery preamble transmissions (e.g., receive beam 410-*b*), and UE 115-*b* may determine to receive a subsequent discovery message 220 from UE 115-*a* using the identified receive beam.

After the second transmission burst in the beam sweeping procedure, UE 115-*a* may transmit a discovery message 220 using the second transmit beam 405-*b*, and UE 115-*b* may attempt to receive the discovery message 220 using the identified receive beam. In the example of FIG. 4 (as illustrated in 400-*b*), UE 115-*a* may determine that a signal quality of the discovery message 220 is above a signal quality threshold, and UE 115-*a* may determine that the discovery message 220 was successfully received. Accordingly (as illustrated in 400-*c*), UE 115-*b* may transmit an acknowledgment signal 225 to UE 115-*b* using the same beam used to receive the discovery message 220 from UE 115-a (i.e., beam 410-b) to acknowledge receipt of the discovery message 220. UE 115-a may then receive the acknowledgment signal using the same beam used to transmit the discovery message 220 to UE 115-b (i.e., beam 405-b).

In the example of FIG. 5, UE 115-a may broadcast discovery preambles 215 in a beam sweeping procedure to identify an appropriate transmit beam for transmitting a discovery message 220 to UE 115-b and to allow UE 115-b to identify an appropriate receive beam for receiving the discovery message 220 from UE 115-a (i.e., the discovery preambles may be used to identify a suitable BPL). In this example, UE 115-a may generate multiple discovery preambles to transmit using each of its transmit beams, and UE 115-b may monitor for the discovery preambles from UE 115-a using its receive beams. UE 115-a may broadcast multiple discovery preambles in a transmission burst using multiple transmit beams in a transmit beam sweep to allow one or more receiving devices to identify a suitable receive beam for receiving the discovery message 220 from UE 115-a.

In a first transmission burst (as illustrated in 500-a), UE 115-a may broadcast N discovery preambles 215 using N transmit beams, where N corresponds to the number of transmit beams available to UE 115-a. UE 115-b may monitor for the discovery preambles 215 transmitted using the N transmit beams using a first receive beam 510-a, and UE 115-b may attempt to receive each of the N discovery preambles 215 using the first receive beam 510-a. In the example of FIG. 5, UE 115-b may fail to receive the discovery preambles 215 using the first receive beam 510-a or UE 115-b may determine that the quality of each of the discovery preambles 215 received in the first transmission burst using receive beam 510-a is below a signal quality threshold. Thus, UE 115-b may avoid transmitting a query signal to UE 115-a to request or trigger a transmission of the discovery message.

In a second transmission burst (as illustrated in 500-a), UE 115-a may rebroadcast the N discovery preambles 215 using the N transmit beams 505. UE 115-b may monitor for the discovery preambles 215 transmitted using the N transmit beams 505, and UE 115-b may attempt to receive each of the N discovery preambles 215 using a second receive beam 510-b. In this case, UE 115-b may successfully receive a discovery preamble 215 of the N discovery preambles 215 using a second receive beam 510-b, and UE 115-a may determine that the quality of the received discovery preamble 215 is above a signal quality threshold. Thus, UE 115-b may identify beam 510-b as a suitable beam for receiving the discovery message 220 from UE 115-a, and UE 115-b may terminate a beam sweeping procedure and avoid monitoring for additional discovery preambles 215 from UE 115-a.

After identifying beam 510-b as a suitable beam for communicating with UE 115-a, UE 115-b may transmit a query signal 225 to UE 115-a to request or trigger a transmission of the discovery message 220. UE 115-b may transmit the query signal 225 using the same beam (i.e., beam 510-b) used to successfully receive the discovery preamble 215. However, since UE 115-a transmitted the discovery preambles 215 using multiple transmit beams, the query signal 225 may not be able to provide a direct indication of a suitable transmit beam for UE 115-a to use to transmit the discovery message 220. Thus (as illustrated in 500-b), UE 115-b may transmit the query signal N times using beam 510-b to allow UE 115-a to identify an appropriate beam for transmitting the discovery message 220 to UE 115-b. Alternatively, UE 115-b may transmit the query signal once on a specific set of resources that corresponds to the appropriate beam for UE 115-a to use to transmit the discovery message 220. In this example, UE 115-a may monitor for the query signal on different sets of resources using different beams, and when UE 115-a receives the query signal on a particular set of resources using a particular beam, UE 115-a may determine to use this beam to transmit the discovery message 220.

In the example of FIG. 5, UE 115-a may receive the query signals 225 from UE 115-b, and UE 115-a may identify beam 505-b as the most suitable beam for transmitting the discovery message 220 (e.g., based on determining that the signal quality associated with the query signal received using beam 505-b is higher than the signal quality associated with the query signals received on other beams 505). UE 115-a may then terminate a beam sweeping procedure and avoid transmitting additional discovery preambles 215 based on receiving the query signal 225, and UE 115-a may transmit the discovery message 220 using the identified beam (as illustrated in 500-c). UE 115-a may then receive the discovery message 220 from UE 115-a using the beam identified based on the discovery preambles 215 received from UE 115-a (i.e., beam 510-b).

Figure 6:
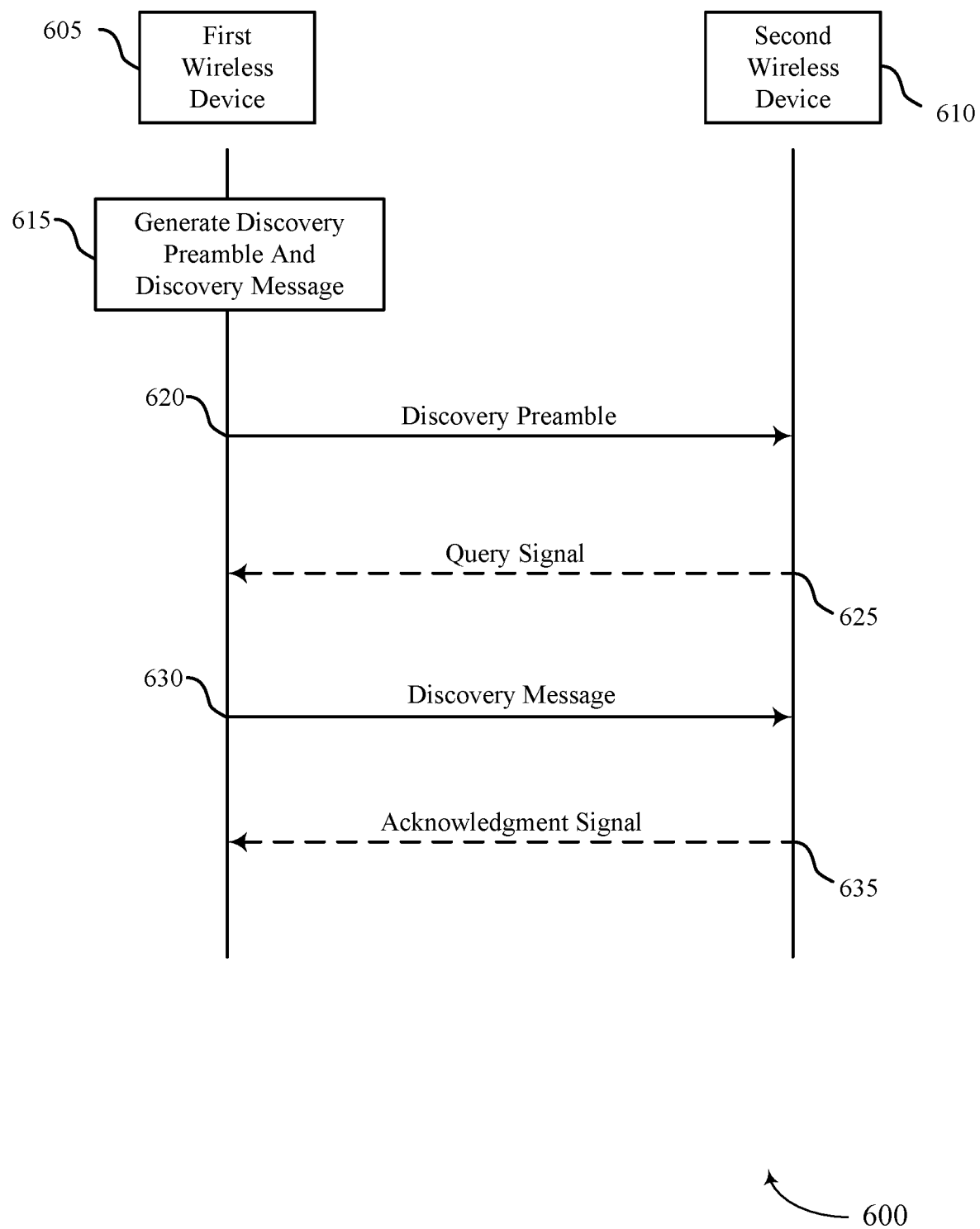
FIG. 6 illustrates an example of a process flow that supports discovery procedure signaling in accordance with aspects of the present disclosure.

FIG. 6 illustrates an example of a process flow 600 that supports discovery procedure signaling in accordance with various aspects of the present disclosure. Process flow 600 illustrates aspects of techniques performed by a first wireless device 605, which may be an example of a UE 115-a described with reference to FIGS. 2-5 or a base station 105 described with reference to FIG. 1. Process flow 600 also illustrates aspects of techniques performed by a second wireless device 610, which may be an example of a UE 115-b or a base station 105 described with reference to FIG. 1. The techniques described with respect to FIG. 6 may be used to improve the efficiency of broadcasting data using beamforming in a device discovery procedure for V2X communications (e.g., between two UEs 115) and for system information transmissions (e.g., in an initial access procedure between a base station 105 and a UE 115).

At 615, first wireless device 605 may generate a discovery preamble and a discovery message to broadcast in a device discovery procedure. The format of the discovery preamble and discovery message may be predefined or may be indicated by another device (e.g., a base station). The discovery preamble may indicate an upcoming transmission of the discovery message. In some cases, discovery preambles may be transmitted N times for every transmission of a discovery message. N may be fixed, or alternatively, N may be configured dynamically (e.g., based on a number of beams available for a broadcast transmission).

In some cases, the device discovery procedure may be a device discovery procedure in V2X. In such cases, the discovery preamble may be a preamble of the discovery message that indicates an upcoming transmission of the discovery message, and the discovery message may include information for identifying a device in a V2X device discovery procedure and/or information indicating resources and configurations for subsequent communications with a device. Specifically, the discovery message may include information for discovering a device and establishing a connection with the device (e.g., information indicating whether first wireless device 605 has information to share with second wireless device 610 or information to receive from second wireless device 610, the type of information to share with or receive from second wireless device 610, etc.).

In other cases, the device discovery procedure may be a part of an initial access procedure. In such cases, the discovery preamble may be a reference signal (e.g., a synchronization signal), and the discovery message may be system information (e.g., transmitted by a base station to a UE).

At 620, first wireless device 605 may transmit the discovery preamble to second wireless device 610 using a transmit beam as part of a beam sweeping procedure. Second wireless device 610 may receive the discovery preamble, and, in some cases, at 625, second wireless device 610 may transmit a query signal to first wireless device 605. The query signal may be in response to the discovery preamble, and may be used as a request or trigger for the discovery message. In some cases, the resources (e.g., time and frequency resources) and configurations (e.g., modulation and coding scheme (MCS) and numerology) used for the transmission of the query signal may be predefined or indicated by another device (e.g., a base station).

In other cases, the resources and configurations used for the transmission of the query signal may correspond to the resources and configurations used for the transmission of the discovery preamble. For example, second wireless device 610 may determine the time and frequency resources to use for the transmission of the query signal based on synchronization information (e.g., timing or frequency synchronization information) acquired from the discovery preamble. Additionally, second wireless device 610 may determine a transmit power for transmitting the query signal based on the receive power of the discovery preamble received at 620.

In some examples, the query signal may be a signal that carries no specific information (i.e., a static message) and may be common to devices in a wireless communications system (e.g., used for query signal transmissions by all devices in a wireless communications system). In other examples, the query signal may include some minimum information about second wireless device 610, such as information about the identity, scheduling, capabilities, states, or discovery modes of second wireless device 610. Further, the query signal may include a Zadoff-Chu (ZC) sequence, a pseudo-noise (PN) sequence, or a maximum length sequence (m-sequence).

Once second wireless device 610 transmits the query signal, second wireless device 610 may terminate or modify the configuration of a beam sweeping procedure used for monitoring for discovery preambles. And once first wireless device 605 receives the query signal, first wireless device 605 may configure subsequent communications based on receiving the query signal. In one example, first wireless device 605 may terminate a beam sweeping procedure used for broadcasting discovery preambles based on receiving the query signal. In another example, first wireless device 605 may reconfigure or adjust the beam sweeping procedure for subsequent communications based on receiving the query signal (e.g., using certain beams for discovery preamble transmissions more often than other beams in the beam sweeping procedure).

At 630, first wireless device 605 may then broadcast the discovery message to one or more UEs in a wireless communications system. In one example, first wireless device 605 may broadcast the discovery message when first wireless device 605 receives the query signal from second wireless device 610. In this example, first wireless device 605 may identify a suitable transmit beam for the transmission of the discovery message based on receiving the query signal. In another example, first wireless device 605 may transmit the discovery message to second wireless device 610 without receiving a query signal. In this example, the first wireless device 605 may transmit multiple discovery preambles using a particular transmit beam prior to the discovery message to allow a receiving device to identify a suitable receive beam for receiving the discovery message, and then first wireless device 605 may broadcast the discovery message using the transmit beam.

The resources and configurations used for the discovery message may depend on a variety of factors. In some cases, the resources and configurations used for the discovery message may be predefined or indicated by another device (e.g., a base station). In other cases, first wireless device 605 may determine the resources and configurations for the discovery message. For example first wireless device 605 may determine the resources and configurations used for the discovery message based on receiving the query signal (e.g., based on the resources and configurations used for the query signal or based on information about the schedule and capabilities of second wireless device 610 indicated in the query signal). Alternatively, first wireless device 605 may determine the resources and configurations used for the discovery message based on the resources and configurations used for the discovery preamble.

In some cases, first wireless device 605 may indicate the resources and configurations to be used for the discovery message transmission in the discovery preamble transmitted to second wireless device 610. In other cases, second wireless device 610 may determine the resources and configurations used for the discovery message based on the resources and configurations used for the discovery preamble or based on an indication from another device (e.g., a base station). In some aspects, the resources and configurations used for the discovery message may be one of K possible candidates (e.g., in a window of resources). In one example, second wireless device 610 may blindly check multiple hypotheses to receive the discovery message. In another example, the resources and configuration of the K possible candidates of the discovery message may be indicated in the discovery preamble. In yet another example, a subset of the multiple hypotheses may be indicated in the discovery preamble, and second wireless device 610 may blindly check the subset of the multiple hypothesis to receive the discovery message.

Second wireless device 610 may receive the discovery message, and, at 635, second wireless device 610 may transmit an acknowledgment signal in response to the discovery message to acknowledge receipt of the discovery message. In some examples, the acknowledgment signal may be a signal that carries no specific information (i.e., a static message) and may be common to devices in a wireless communications system (e.g., used for acknowledgment signal transmissions by all devices in a wireless communications system). In other examples, the acknowledgment signal may include some minimum information about second wireless device 610, such as information about the identity, scheduling, capabilities, states, or discovery modes of UE 115-b. Further, the acknowledgment signal may include a ZC sequence, a PN sequence, or an m-sequence.

In some cases, the resources (e.g., time and frequency resources) and configurations (e.g., MCS) used for the transmission of the acknowledgment signal may be predefined or indicated by another device (e.g., a base station). In other cases, the resources and configurations used for the transmission of the acknowledgment signal may correspond to the resources and configurations used for the transmission of the discovery preamble. For example, second wireless device 610 may determine the time and frequency resources to use for the transmission of the query signal based on synchronization information (e.g., timing or frequency synchronization information) acquired from the discovery preamble. Additionally, second wireless device 610 may determine a transmit power for transmitting the acknowledgment signal based on the receive power of the discovery preamble received at 620. In yet other cases, the resources and configurations used for the transmission of the acknowledgement signal may be indicated in the corresponding discovery message.

Once second wireless device 610 transmits the acknowledgment signal, second wireless device 610 may terminate or modify the configuration of a beam sweeping procedure used for monitoring for discovery preambles. And once first wireless device 605 receives the acknowledgment signal, first wireless device 605 may configure subsequent communications based on receiving the acknowledgment signal. In one example, first wireless device 605 may terminate a beam sweeping procedure used for broadcasting discovery preambles based on receiving the acknowledgment signal. In another example, first wireless device 605 may reconfigure or adjust the beam sweeping procedure for subsequent communications based on receiving the acknowledgement signal (e.g., using certain beams for discovery preamble transmissions more often than other beams in the beam sweeping procedure). In yet other examples, first wireless device 605 may initiate a link establishment procedure to establish a connection with second wireless device 610 based on receiving the acknowledgement signal. First wireless device 605 may also set or modify configurations for a random access procedure based on receiving the acknowledgement signal (e.g., allocating resources for signaling in the random access procedure).

Figure 7:
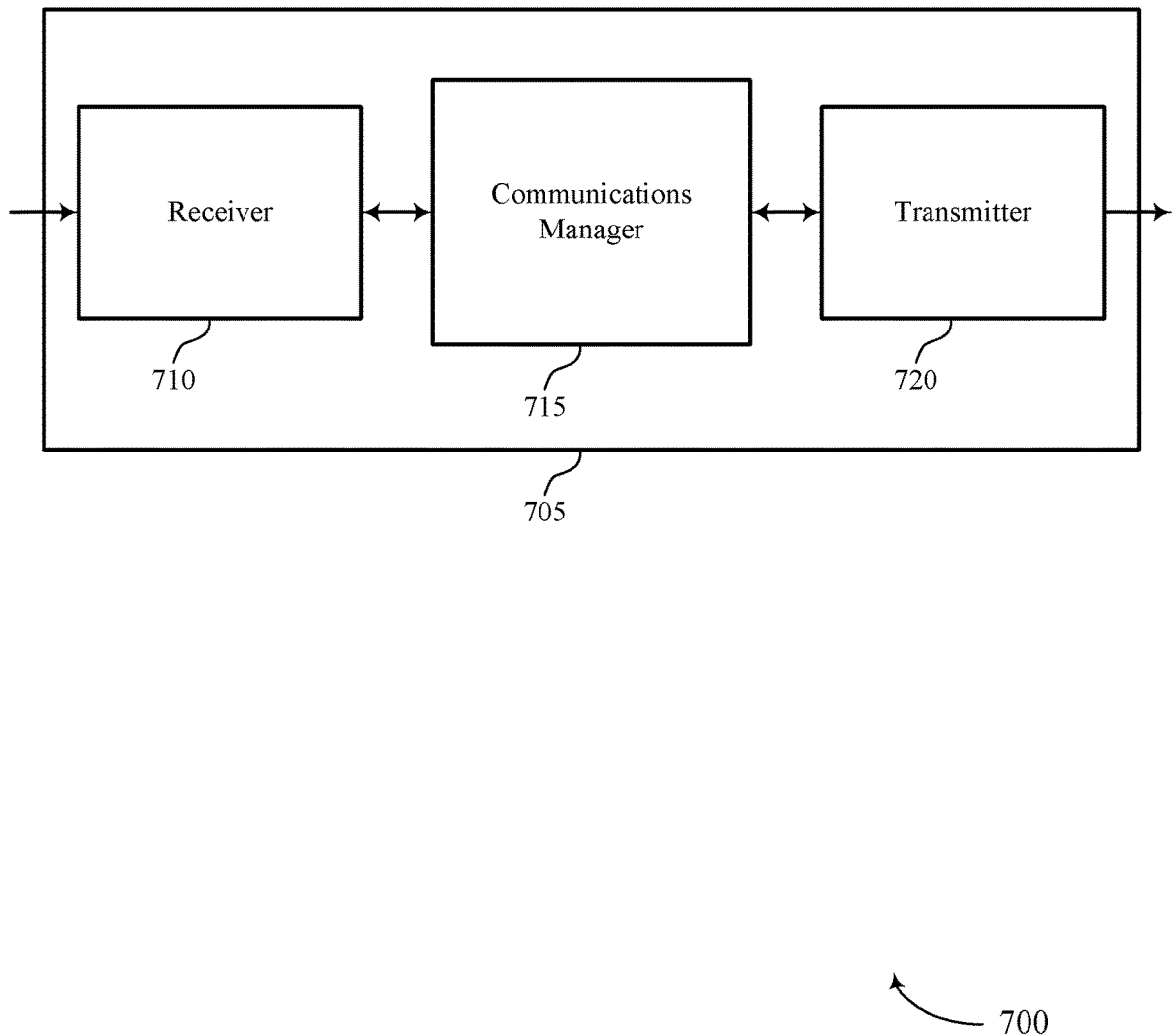
FIGS. 7-9 show block diagrams of a device that supports discovery procedure signaling in accordance with aspects of the present disclosure.

FIG. 7 shows a block diagram 700 of a wireless device 705 that supports discovery procedure signaling in accordance with aspects of the present disclosure. Wireless device 705 may be an example of aspects of a UE 115 or base station 105 as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to discovery procedure signaling, etc.). Information may be passed on to other components of the device. The receiver 710 may be an example of aspects of the transceiver 1035 described with reference to FIG. 10. The receiver 710 may utilize a single antenna or a set of antennas.

Communications manager 715 may be an example of aspects of the communications manager 1015 described with reference to FIG. 10. Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may generate a discovery preamble and a discovery message to broadcast in a device discovery procedure, transmit the discovery preamble using a transmit beam as part of a beam sweeping procedure, where the discovery preamble indicates an upcoming transmission of the discovery message, receive a signal in response to the discovery preamble or the discovery message, and transmit the discovery message based on the transmitting the discovery preamble. The communications manager 715 may also monitor for a set of discovery preambles using a set of receive beams as part of a beam sweeping procedure and receive a discovery preamble of the set of discovery preambles using a receive beam of the set of receive beams based on the monitoring. The discover preamble may indicate an upcoming transmission of a discovery message, receive the discovery message using the receive beam, and transmit a signal in response to the discovery preamble or the discovery message using a transmit beam corresponding to the receive beam.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
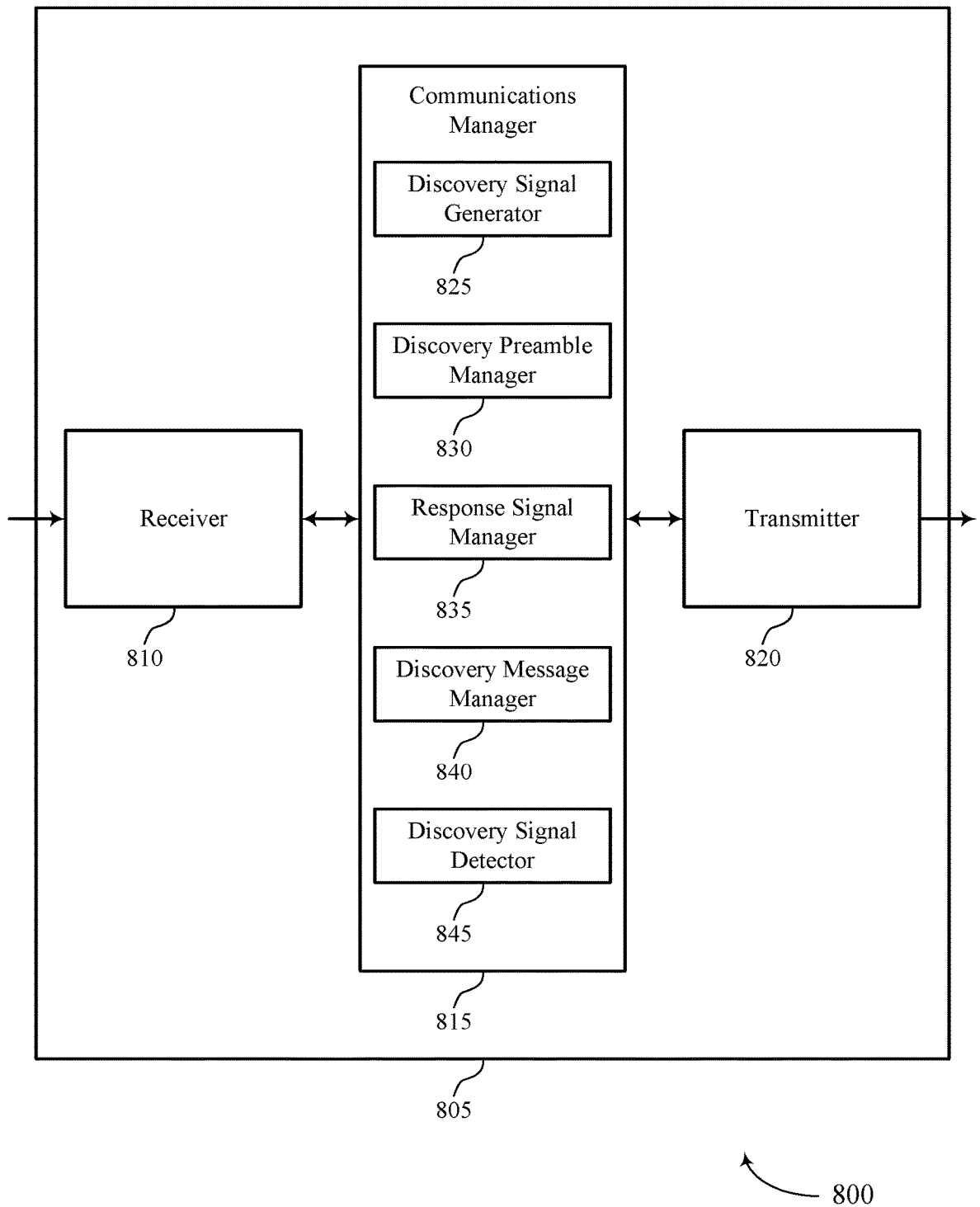

FIG. 8 shows a block diagram 800 of a wireless device 805 that supports discovery procedure signaling in accordance with aspects of the present disclosure. Wireless device 805 may be an example of aspects of a wireless device 705 or a UE 115 or base station 105 as described with reference to FIG. 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to discovery procedure signaling, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10. Communications manager 815 may include discovery signal generator 825, discovery preamble manager 830, response signal manager 835, discovery message manager 840, and discovery signal detector 845.

Discovery signal generator 825 may generate a discovery preamble and a discovery message to broadcast in a device discovery procedure. Discovery preamble manager 830 may then transmit the discovery preamble using a transmit beam as part of a beam sweeping procedure, where the discovery preamble indicates an upcoming transmission of the discovery message. Response signal manager 835 may receive a signal in response to the discovery preamble or the discovery message, and discovery message manager 840 may transmit the discovery message based on the transmitting the discovery preamble.

Discovery signal detector 845 may monitor for a set of discovery preambles using a set of receive beams as part of a beam sweeping procedure. Discovery preamble manager 830 may receive a discovery preamble of the set of discovery preambles using a receive beam of the set of receive beams based on the monitoring, where the discovery preamble indicates an upcoming transmission of a discovery message. Discovery message manager 840 may then receive the discovery message using the receive beam, and response signal manager 835 may transmit a signal in response to the discovery preamble or the discovery message using a transmit beam corresponding to the receive beam.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
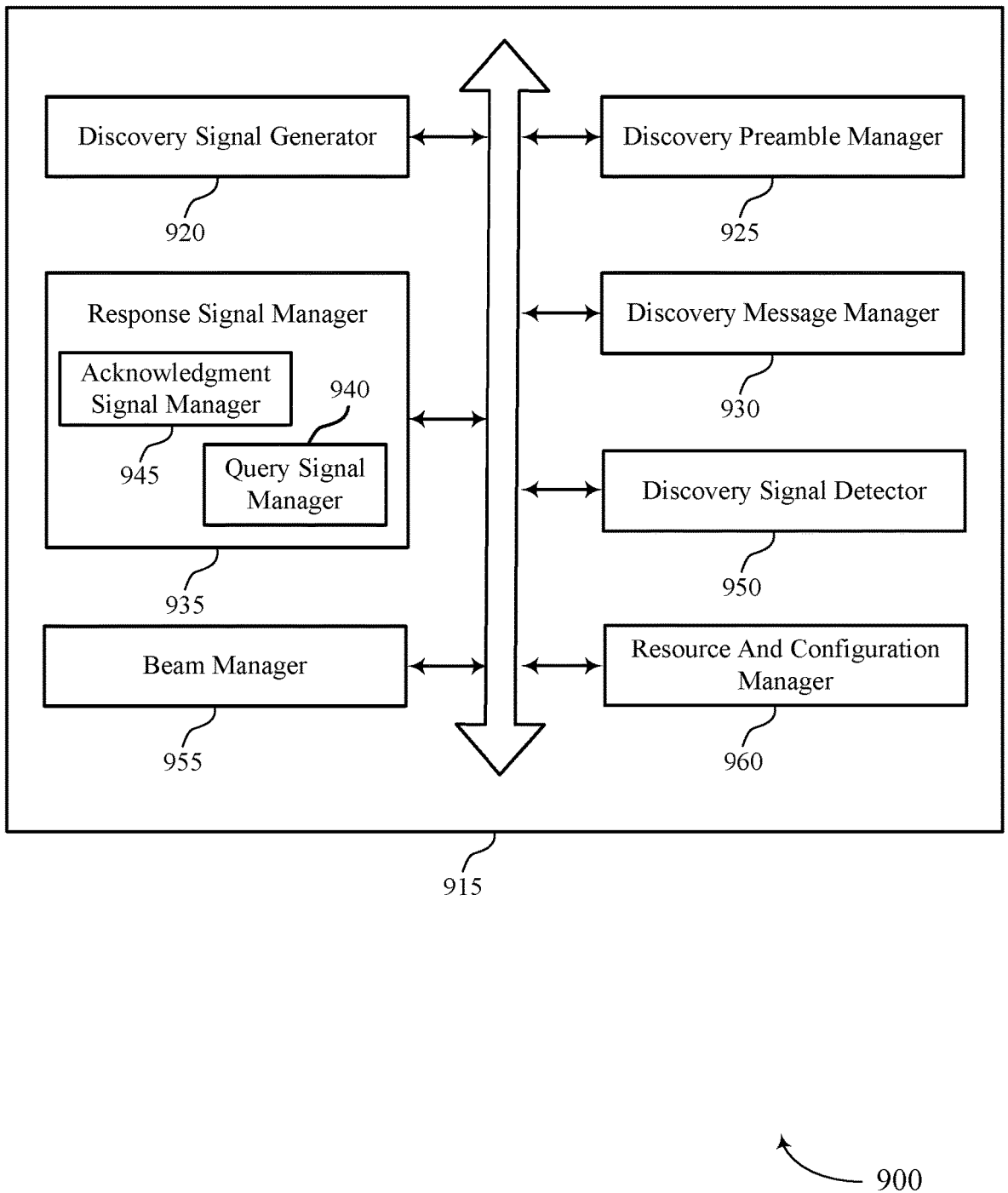

FIG. 9 shows a block diagram 900 of a communications manager 915 that supports discovery procedure signaling in accordance with aspects of the present disclosure. The communications manager 915 may be an example of aspects of a communications manager 715, a communications manager 815, or a communications manager 1015 described with reference to FIGS. 7, 8, and 10. The communications manager 915 may include discovery signal generator 920, discovery preamble manager 925, discovery message manager 930, response signal manager 935, query signal manager 940, acknowledgment signal manager 945, discovery signal detector 950, beam manager 955, and resource and configuration manager 960. Each of these modules may communicate, directly or indirectly, with one another (e.g., via one or more buses).

Discovery signal generator 920 may generate a discovery preamble and a discovery message to broadcast in a device discovery procedure. In some cases, the discovery preamble includes a preamble of a discovery message in a V2X device discovery procedure, and the discovery message includes information for identifying a device in the V2X device discovery procedure. In some cases, the discovery preamble includes a reference signal and the discovery message includes system information. Discovery preamble manager 925 may then transmit the discovery preamble using a transmit beam as part of a beam sweeping procedure, where the discovery preamble indicates an upcoming transmission of the discovery message. In some cases, a first frequency of discovery preamble transmissions is greater than a second frequency of discovery message transmissions.

Response signal manager 935 may receive a signal in response to the discovery preamble or the discovery message. For example, query signal manager 940 may receive a query signal in response to the discovery preamble, where the discovery message is transmitted based on receiving the query signal. Additionally, or alternatively, acknowledgment signal manager 945 may receive an acknowledgment signal in response to the discovery message, where the acknowledgment signal acknowledges receipt of the discovery message. In some cases, the signal includes a Zadoff-Chu sequence, a pseudo-noise sequence, or a maximum length sequence. In some cases, the signal includes a static message used by a set of devices. In some cases, the signal includes an indication of an identity, schedule, capability, state, or discovery mode of a receiving device. Beam manager 955 may terminate the beam sweeping procedure based on receiving the signal. Discovery message manager 930 may transmit the discovery message based on the transmitting the discovery preamble.

In some cases, discovery preamble manager 925 may transmit a first set of discovery preambles using a first transmit beam in a first transmission burst and transmit a second set of discovery preambles using a second transmit beam in a second transmission burst. In such cases, query signal manager 940 may receive a query signal in response to a discovery preamble in the first or second set of discovery preambles transmitted using the first or second transmit beam. Beam manager 955 may adjust the beam sweeping procedure for subsequent transmissions of discovery preambles and discovery messages based on receiving the signal. In some cases, beam manager 955 may determine to use the first or second transmit beam for transmitting the discovery message based on receiving the query signal, and discovery message manager 930 may transmit the discovery message using the first or second transmit beam.

In some cases, discovery message manager 930 may transmit a first discovery message using the first transmit beam after the first transmission burst and transmit a second discovery message using the second transmit beam after the second transmission burst. In such cases, acknowledgment signal manager 945 may receive an acknowledgement signal in response to the first or second discovery message, where the acknowledgement signal acknowledges receipt of the first or second discovery message, and resource and configuration manager 960 may configure subsequent communications based on receiving the acknowledgement signal. In some cases, discovery preamble manager 925 may transmit a first set of discovery preambles using a set of transmit beams in a first transmission burst and transmit a second set of discovery preambles using the set of transmit beams in a second transmission burst.

Resource and configuration manager 960 may identify a first set of resources and configurations for transmitting the discovery preamble, a second set of resources and configurations for transmitting the discovery message, and a third set of resources and configurations for receiving the signal. In some cases, resource and configuration manager 960 may receive an indication of the first set of resources and configurations for transmitting the discovery preamble, the second set of resources and configurations for transmitting the discovery message, and the third set of resources and configurations for receiving the signal. In some cases, the first set of resources and configurations used for transmitting the discovery preamble, the second set of resources and configurations used for transmitting the discovery message, and the third set of resources and configurations used for receiving the signal are predefined.

In some cases, the second set of resources and configurations used for transmitting the discovery message is identified based on the first set of resources and configurations used for transmitting the discovery preamble. In some cases, the signal is received in response to the discovery preamble, and the third set of resources and configurations used for receiving the signal is identified based on the first set of resources and configurations used for transmitting the discovery preamble. In some cases, the second set of resources and configurations used for transmitting the discovery message is identified based on the third set of resources and configurations used for receiving the signal. In some cases, the second set of resources and configurations used for transmitting the discovery message is identified based on receiving the signal. In some cases, the signal is received in response to the discovery message, and the third set of resources and configurations used for receiving the signal is identified based on the first set of resources and configurations used for transmitting the discovery preamble or the second set of resources and configurations used for transmitting the discovery message.

Discovery signal detector 950 may monitor for a set of discovery preambles using a set of receive beams as part of a beam sweeping procedure. Discovery preamble manager 925 may receive a discovery preamble of the set of discovery preambles using a receive beam of the set of receive beams based on the monitoring, where the discovery preamble indicates an upcoming transmission of a discovery message. In some cases, the discovery preamble includes a preamble of a discovery message in a V2X device discovery procedure, and the discovery message includes information for identifying a device in the V2X device discovery procedure. In some cases, the discovery preamble includes a reference signal and the discovery message includes system information. Discovery message manager 930 may receive the discovery message using the receive beam. In some cases, a first frequency of discovery preamble transmissions may be greater than a second frequency of discovery message transmissions.

Response signal manager 935 may transmit a signal in response to the discovery preamble or the discovery message using a transmit beam corresponding to the receive beam. For example, query signal manager 940 may transmit a query signal in response to the discovery preamble, where the discovery message is received based on transmitting the query signal. Additionally, or alternatively, acknowledgment signal manager 945 may transmit an acknowledgment signal in response to the discovery message, where the acknowledgment signal acknowledges receipt of the discovery message. In some cases, beam manager 955 may terminate the beam sweeping procedure based on transmitting the acknowledgment signal. In some cases, beam manager 955 may adjust the beam sweeping procedure for subsequent receptions of discovery preambles and discovery messages based on the acknowledgment signal. In some cases, resource and configuration manager 960 may configure subsequent communications based on the acknowledgment signal. In some cases, the signal includes a Zadoff-Chu sequence, a pseudo-noise sequence, or a maximum length sequence. In some cases, the signal includes a static message used by a set of devices. In some cases, the signal includes an indication of an identity, schedule, capability, state, or discovery mode of a receiving device.

In some cases, discovery signal detector 950 may monitor for a first set of discovery preambles using a set of receive beams in a first transmission burst, where each discovery preamble in the first set of discovery preambles is transmitted using a first transmit beam, and monitor for a second set discovery preambles using the set of receive beams in a second transmission burst, where each discovery preamble in the second set of discovery preambles is transmitted using a second transmit beam. In some cases, beam manager 955 may identify a first receive beam of the set of receive beams for receiving a first discovery message after the first transmission burst, where the first receive beam is identified based on monitoring for the first set of discovery preambles using the set of receive beams, and discovery message manager 930 may receive the first discovery message after the first transmission burst using the first receive beam In some cases, discovery message manager 930 may determine that a quality of the first discovery message is below a signal quality threshold, and acknowledgment signal manager 945 may avoid transmitting an acknowledgment signal in response to the first discovery message. In some cases, beam manager 955 may identify a second receive beam of the set of receive beams for receiving a second discovery message after the second transmission burst, where the second receive beam is identified based on monitoring for the second set of discovery preambles using the set of receive beams, and discovery message manager 930 may receive the second discovery message after the second transmission burst using the second receive beam. In some cases, discovery message manager 930 may determine that a quality of the second discovery message is above a signal quality threshold, and acknowledgment signal manager 945 may transmit an acknowledgment signal in response to the second discovery message, where the acknowledgment signal acknowledges receipt of the second discovery message.

In some cases, discovery signal detector 950 may monitor for a first set of discovery preambles using a first receive beam in a first transmission burst, where the first set of discovery preambles are transmitted using a set of transmit beams, and monitor for a second set of discovery preambles using a second receive beam in a second transmission burst, where the second set of discovery preambles are transmitted using the set of transmit beams. In some cases, discovery preamble manager 925 may identify timing information based on the discovery preamble, where the signal is transmitted based on the timing information. In some cases, discovery preamble manager 925 may identify a receive power of the discovery preamble and determine a transmit power for transmitting the signal based on the receive power. Response signal manager 935 may then transmit the signal using the transmit power.

Resource and configuration manager 960 may identify a first set of resources and configurations for monitoring for the set of discovery preambles, a second set of resources and configurations for monitoring for the discovery message, and a third set of resources and configurations for transmitting the signal. In some cases, resource and configuration manager 960 may receive an indication of the first set of resources and configurations for monitoring for the set of discovery preambles, the second set of resources and configurations for monitoring for the discovery message, and the third set of resources and configurations for transmitting the signal. In some cases, the first set of resources and configurations for monitoring for the set of discovery preambles, the second set of resources and configurations for monitoring for the discovery message, and the third set of resources and configurations for transmitting the signal are predefined.

In some cases, the second set of resources and configurations used for monitoring for the discovery message is identified based on the first set of resources and configurations used for monitoring for the set of discovery preambles. In some cases, the signal is transmitted in response to the discovery preamble, and the third set of resources and configurations used for transmitting the signal is identified based on the first set of resources and configurations used for monitoring for the set of discovery preambles. In some cases, the second set of resources and configurations used for monitoring for the discovery message is identified based on the third set of resources and configurations used for transmitting the signal. In some cases, the second set of resources and configurations used for monitoring for the discovery message is identified based on transmitting the signal. In some cases, the signal is received in response to the discovery message, and the third set of resources and configurations used for transmitting the signal is identified based on the first set of resources and configurations used for monitoring for the set of discovery preambles or the second set of resources and configurations used for monitoring for the discovery message.

Figure 10:
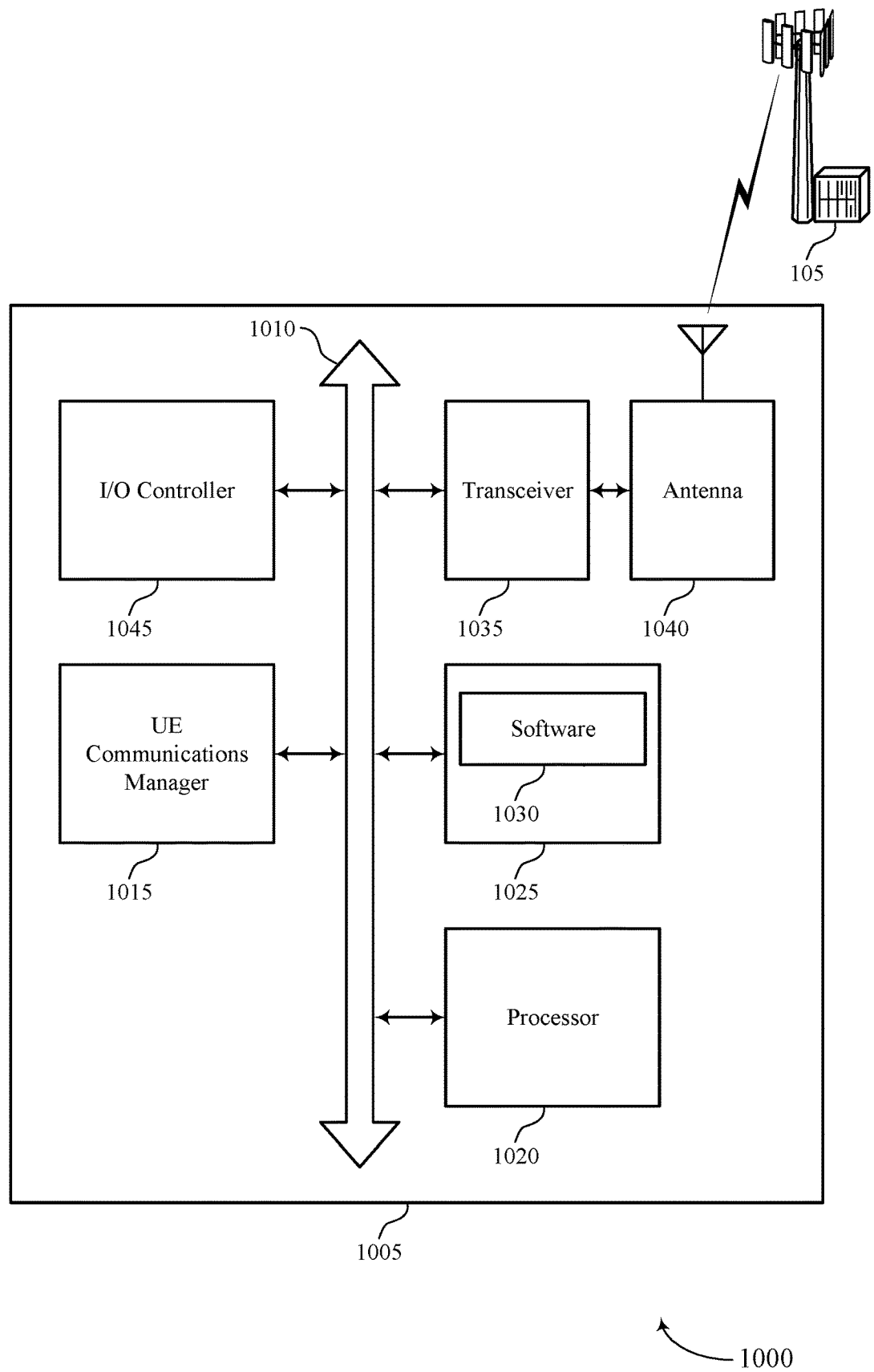
FIG. 10 illustrates a block diagram of a system including a user equipment (UE) that supports discovery procedure signaling in accordance with aspects of the present disclosure.

FIG. 10 shows a diagram of a system 1000 including a device 1005 that supports discovery procedure signaling in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting discovery procedure signaling).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support discovery procedure signaling. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
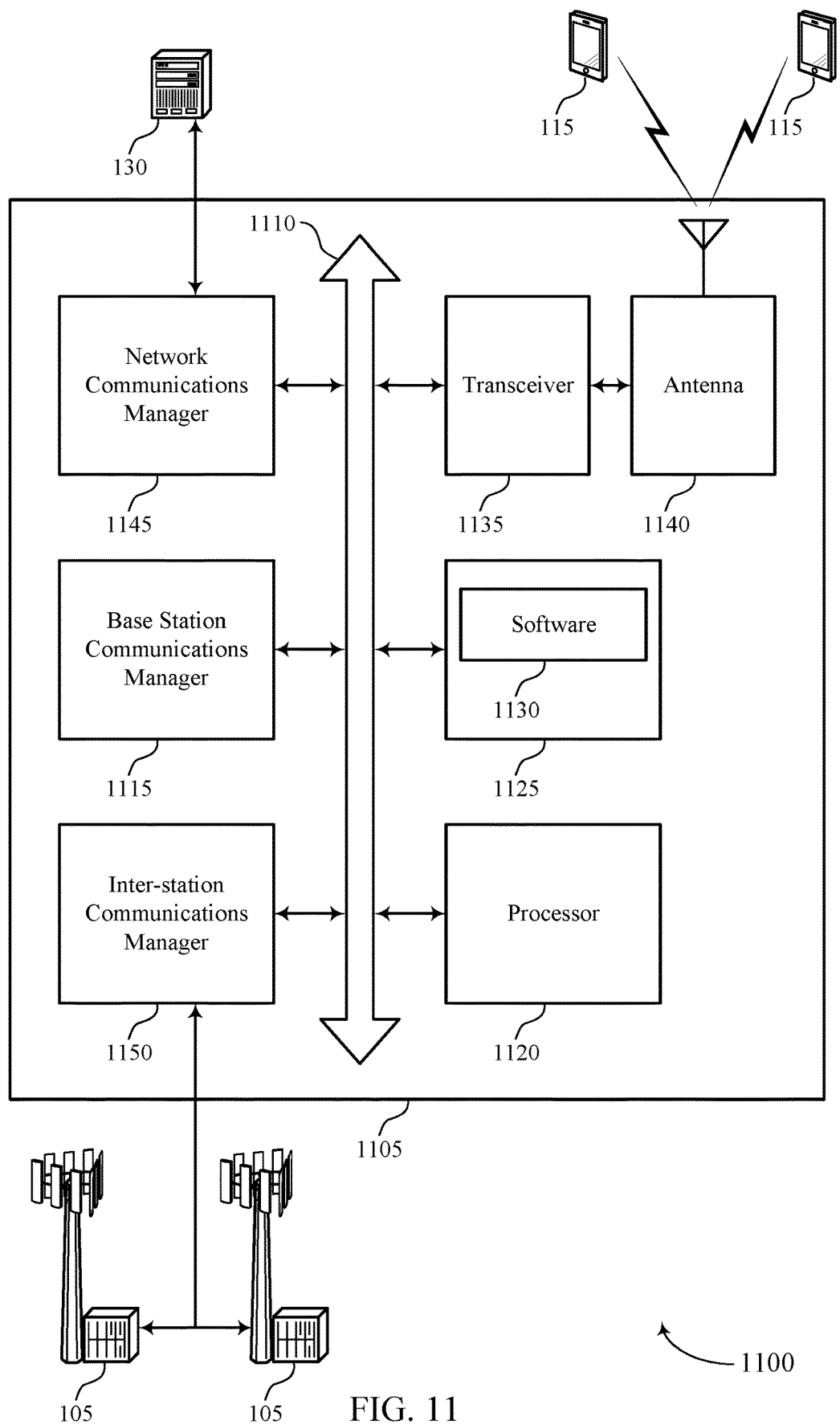
FIG. 11 illustrates a block diagram of a system including a base station that supports discovery procedure signaling in accordance with aspects of the present disclosure.

FIG. 11 shows a diagram of a system 1100 including a device 1105 that supports discovery procedure signaling in accordance with aspects of the present disclosure. Device 1105 may be an example of or include the components of wireless device 705, wireless device 805, or a base station 105 as described above, e.g., with reference to FIGS. 7 and 8. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting discovery procedure signaling).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support discovery procedure signaling. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an Long Term Evolution (LTE)/LTE-A wireless communication network technology to provide communication between base stations 105.

Figure 12:
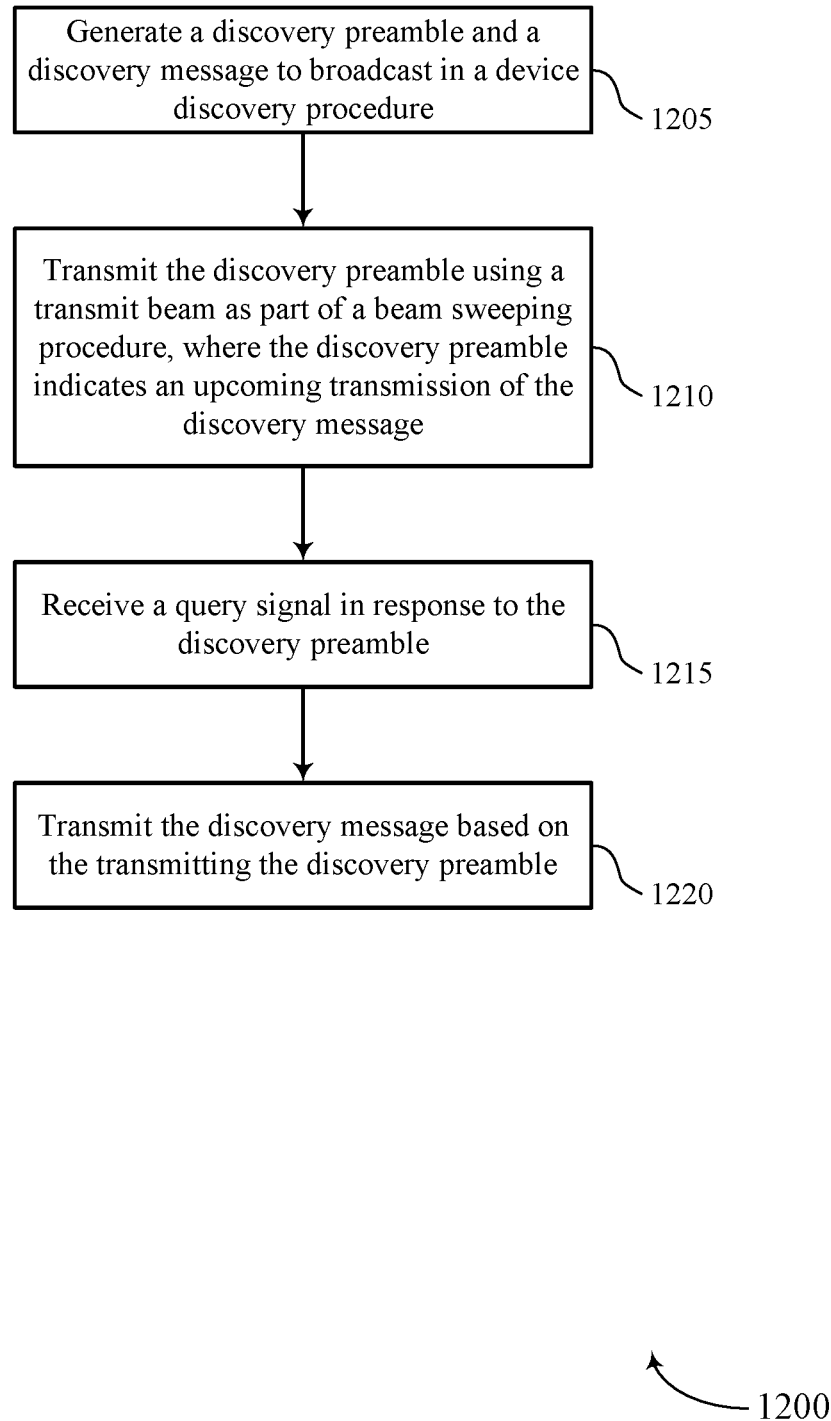
FIGS. 12-15 illustrate methods for discovery procedure signaling in accordance with aspects of the present disclosure.

FIG. 12 shows a flowchart illustrating a method 1200 for discovery procedure signaling in accordance with aspects of the present disclosure. The operations of method 1200 may be implemented by a UE 115 or base station 105 or its components as described herein. For example, the operations of method 1200 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1205 the UE 115 or base station 105 may generate a discovery preamble and a discovery message to broadcast in a device discovery procedure. The operations of 1205 may be performed according to the methods described herein. In certain examples, aspects of the operations of 1205 may be performed by a discovery signal generator as described with reference to FIGS. 7 through 9.

At 1210 the UE 115 or base station 105 may transmit the discovery preamble using a transmit beam as part of a beam sweeping procedure, wherein the discovery preamble indicates an upcoming transmission of the discovery message. The operations of 1210 may be performed according to the methods described herein. In certain examples, aspects of the operations of 1210 may be performed by a discovery preamble manager as described with reference to FIGS. 7 through 9.

At 1215 the UE 115 or base station 105 may receive a query signal in response to the discovery preamble. The operations of 1215 may be performed according to the methods described herein. In certain examples, aspects of the operations of 1215 may be performed by a response signal manager as described with reference to FIGS. 7 through 9.

At 1220 the UE 115 or base station 105 may transmit the discovery message based at least in part on the transmitting the discovery preamble and based at least in part on receiving the query signal. The operations of 1220 may be performed according to the methods described herein. In certain examples, aspects of the operations of 1220 may be performed by a discovery message manager as described with reference to FIGS. 7 through 9.

Figure 13:
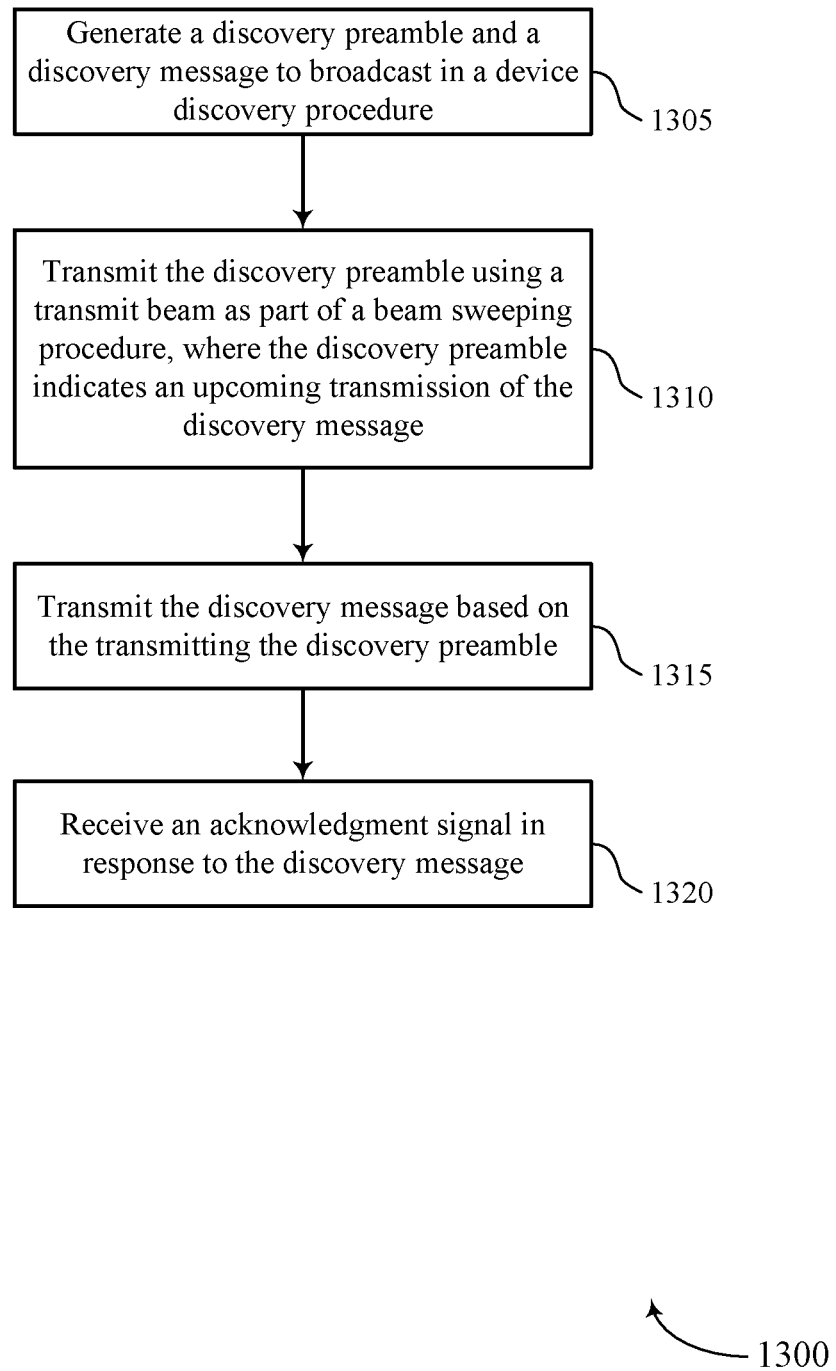

FIG. 13 shows a flowchart illustrating a method 1300 for discovery procedure signaling in accordance with aspects of the present disclosure. The operations of method 1300 may be implemented by a UE 115 or base station 105 or its components as described herein. For example, the operations of method 1300 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1305 the UE 115 or base station 105 may generate a discovery preamble and a discovery message to broadcast in a device discovery procedure. The operations of 1305 may be performed according to the methods described herein. In certain examples, aspects of the operations of 1305 may be performed by a discovery signal generator as described with reference to FIGS. 7 through 9.

At 1310 the UE 115 or base station 105 may transmit the discovery preamble using a transmit beam as part of a beam sweeping procedure, wherein the discovery preamble indicates an upcoming transmission of the discovery message. The operations of 1310 may be performed according to the methods described herein. In certain examples, aspects of the operations of 1310 may be performed by a discovery preamble manager as described with reference to FIGS. 7 through 9.

At 1315 the UE 115 or base station 105 may transmit the discovery message based at least in part on the transmitting the discovery preamble. The operations of 1315 may be performed according to the methods described herein. In certain examples, aspects of the operations of 1315 may be performed by a discovery message manager as described with reference to FIGS. 7 through 9.

At 1320 the UE 115 or base station 105 may receive an acknowledgment signal in response to the discovery message. The operations of 1325 may be performed according to the methods described herein. In certain examples, aspects of the operations of 1325 may be performed by a response signal manager as described with reference to FIGS. 7 through 9.

Figure 14:
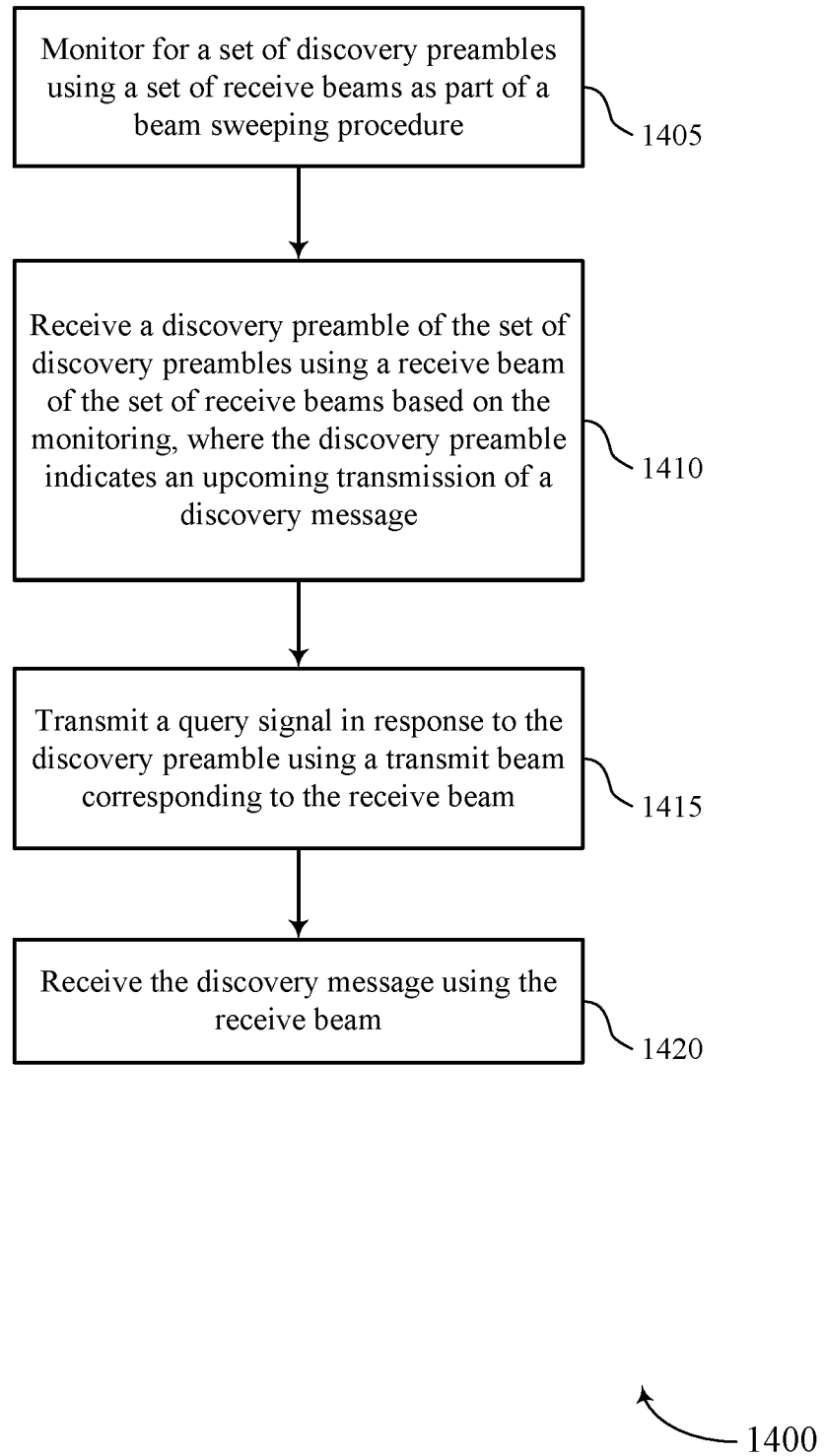

FIG. 14 shows a flowchart illustrating a method 1400 for discovery procedure signaling in accordance with aspects of the present disclosure. The operations of method 1400 may be implemented by a UE 115 or base station 105 or its components as described herein. For example, the operations of method 1400 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1405 the UE 115 or base station 105 may monitor for a plurality of discovery preambles using a plurality of receive beams as part of a beam sweeping procedure. The operations of 1405 may be performed according to the methods described herein. In certain examples, aspects of the operations of 1405 may be performed by a discovery signal detector as described with reference to FIGS. 7 through 9.

At 1410 the UE 115 or base station 105 may receive a discovery preamble of the plurality of discovery preambles using a receive beam of the plurality of receive beams based at least in part on the monitoring, wherein the discovery preamble indicates an upcoming transmission of a discovery message. The operations of 1410 may be performed according to the methods described herein. In certain examples, aspects of the operations of 1410 may be performed by a discovery preamble manager as described with reference to FIGS. 7 through 9.

At 1415 the UE 115 or base station 105 may transmit a query signal in response to the discovery preamble using a transmit beam corresponding to the receive beam. The operations of 1415 may be performed according to the methods described herein. In certain examples, aspects of the operations of 1415 may be performed by a response signal manager as described with reference to FIGS. 7 through 9.

At 1420 the UE 115 or base station 105 may receive the discovery message using the receive beam. The operations of 1420 may be performed according to the methods described herein. In certain examples, aspects of the operations of 1420 may be performed by a discovery message manager as described with reference to FIGS. 7 through 9.

Figure 15:
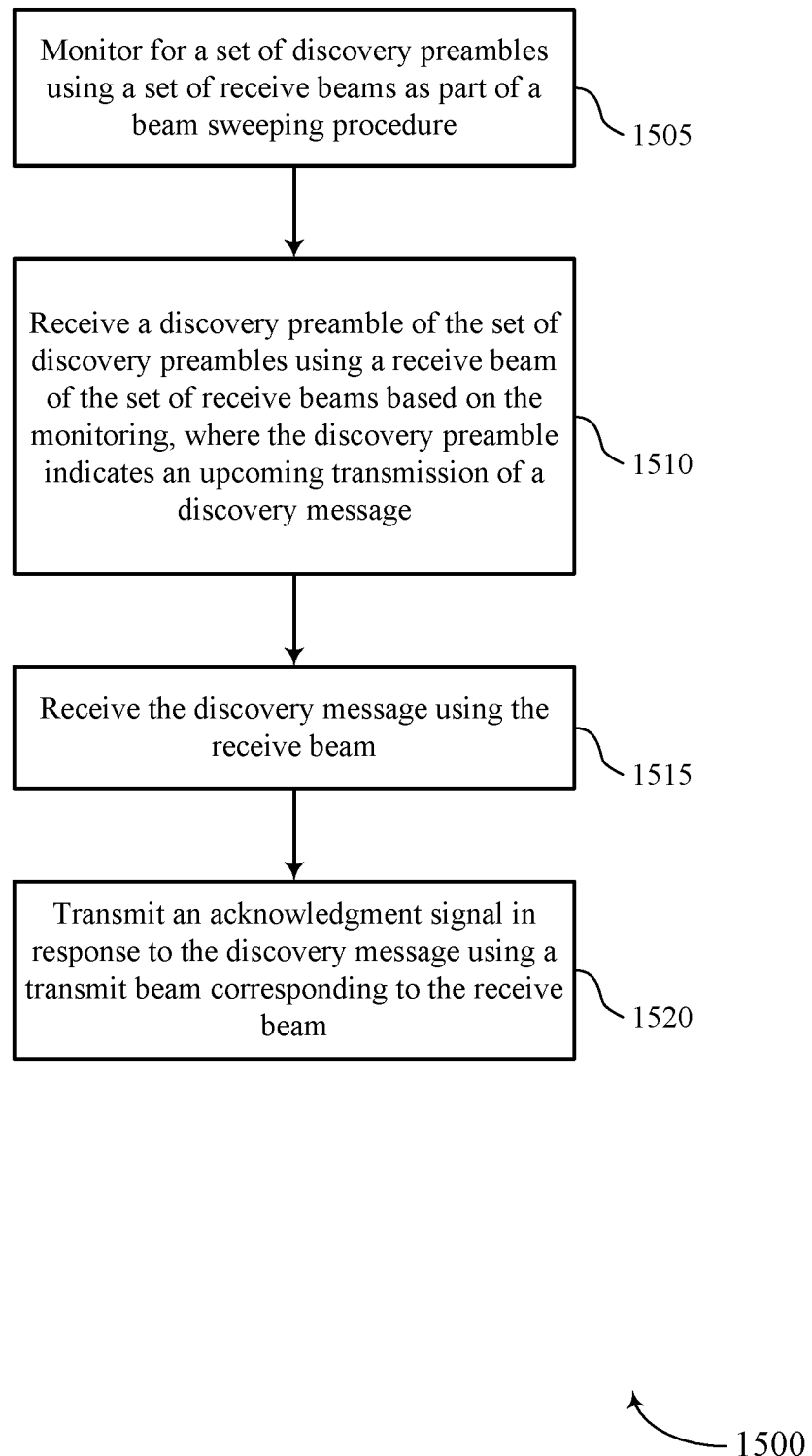

FIG. 15 shows a flowchart illustrating a method 1500 for discovery procedure signaling in accordance with aspects of the present disclosure. The operations of method 1500 may be implemented by a UE 115 or base station 105 or its components as described herein. For example, the operations of method 1500 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1505 the UE 115 or base station 105 may monitor for a plurality of discovery preambles using a plurality of receive beams as part of a beam sweeping procedure. The operations of 1505 may be performed according to the methods described herein. In certain examples, aspects of the operations of 1505 may be performed by a discovery signal detector as described with reference to FIGS. 7 through 9.

At 1510 the UE 115 or base station 105 may receive a discovery preamble of the plurality of discovery preambles using a receive beam of the plurality of receive beams based at least in part on the monitoring, wherein the discovery preamble indicates an upcoming transmission of a discovery message. The operations of 1510 may be performed according to the methods described herein. In certain examples, aspects of the operations of 1510 may be performed by a discovery preamble manager as described with reference to FIGS. 7 through 9.

At 1515 the UE 115 or base station 105 may receive the discovery message using the receive beam. The operations of 1515 may be performed according to the methods described herein. In certain examples, aspects of the operations of 1515 may be performed by a discovery message manager as described with reference to FIGS. 7 through 9.

At 1520 the UE 115 or base station 105 may transmit an acknowledgment signal in response to the discovery preamble or the discovery message using a transmit beam corresponding to the receive beam. The operations of 1520 may be performed according to the methods described herein. In certain examples, aspects of the operations of 1520 may be performed by a response signal manager as described with reference to FIGS. 7 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium used to carry or store desired program code means in the form of instructions or data structures and/or accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
generating a discovery preamble and a discovery message to broadcast in a device discovery procedure;
transmitting the discovery preamble using a transmit beam as part of a beam sweeping procedure, wherein the discovery preamble indicates an upcoming transmission of the discovery message;
receiving a signal in response to the discovery preamble or the discovery message; and
transmitting the discovery message based at least in part on the transmitting the discovery preamble.

2. The method of claim 1, wherein a first frequency of discovery preamble transmissions is greater than a second frequency of discovery message transmissions.

3. The method of claim 1, wherein receiving the signal comprises:
receiving a query signal in response to the discovery preamble or receiving an acknowledgment signal in response to the discovery message, or receiving the query signal and the acknowledgment signal in response to the discovery message, wherein the discovery message is transmitted based at least in part on receiving the query signal, and wherein the acknowledgment signal acknowledges receipt of the discovery message.

4. The method of claim 1, further comprising:
terminating the beam sweeping procedure based at least in part on receiving the signal.

5. The method of claim 1, wherein transmitting the discovery preamble using the transmit beam comprises:
transmitting a first plurality of discovery preambles using a first transmit beam in a first transmission burst; and
transmitting a second plurality of discovery preambles using a second transmit beam in a second transmission burst.

6. The method of claim 5, wherein receiving the signal comprises:
receiving a query signal in response to a discovery preamble in the first or second plurality of discovery preambles transmitted using the first or second transmit beam; and
adjusting the beam sweeping procedure for subsequent transmissions of discovery preambles and discovery messages based at least in part on receiving the signal.

7. The method of claim 6, further comprising:
determining to use the first or second transmit beam for transmitting the discovery message based at least in part on the receiving; and
transmitting the discovery message using the first or second transmit beam.

8. The method of claim 5, further comprising:
transmitting a first discovery message using the first transmit beam after the first transmission burst; and
transmitting a second discovery message using the second transmit beam after the second transmission burst.

9. The method of claim 8, wherein receiving the signal comprises:
receiving an acknowledgment signal in response to the first or second discovery message, wherein the acknowledgment signal acknowledges receipt of the first or second discovery message; and
configuring subsequent communications based at least in part on receiving the acknowledgment signal.

10. The method of claim 1, wherein transmitting the discovery preamble using the transmit beam comprises:
transmitting a first plurality of discovery preambles using a plurality of transmit beams in a first transmission burst; and
transmitting a second plurality of discovery preambles using the plurality of transmit beams in a second transmission burst.

11. The method of claim 1, further comprising:
identifying a first set of resources and configurations for transmitting the discovery preamble, a second set of resources and configurations for transmitting the discovery message, and a third set of resources and configurations for receiving the signal.

12. The method of claim 11, wherein identifying the first set of resources and configurations, the second set of resources and configurations, and the third set of resources and configurations comprises:
receiving an indication of the first set of resources and configurations for transmitting the discovery preamble, the second set of resources and configurations for transmitting the discovery message, and the third set of resources and configurations for receiving the signal.

13. The method of claim 11, wherein the first set of resources and configurations used for transmitting the discovery preamble, the second set of resources and configurations used for transmitting the discovery message, and the third set of resources and configurations used for receiving the signal are predefined.

14. The method of claim 11, wherein the second set of resources and configurations used for transmitting the discovery message is identified based at least in part on the first set of resources and configurations used for transmitting the discovery preamble.

15. The method of claim 11, wherein the signal is received in response to the discovery preamble, and the third set of resources and configurations used for receiving the signal is identified based at least in part on the first set of resources and configurations used for transmitting the discovery preamble.

16. The method of claim 15, wherein the second set of resources and configurations used for transmitting the discovery message is identified based at least in part on the third set of resources and configurations used for receiving the signal.

17. The method of claim 15, wherein the second set of resources and configurations used for transmitting the discovery message is identified based at least in part on receiving the signal.

18. The method of claim 11, wherein the signal is received in response to the discovery message, and the third set of resources and configurations used for receiving the signal is identified based at least in part on the first set of resources and configurations used for transmitting the discovery preamble or the second set of resources and configurations used for transmitting the discovery message.

19. The method of claim 1, wherein the discovery preamble comprises a preamble of a discovery message in a vehicle-to-everything (V2X) device discovery procedure, and the discovery message comprises information for identifying a device in the V2X device discovery procedure.

20. The method of claim 1, wherein the discovery preamble comprises a reference signal and the discovery message comprises system information.

21. The method of claim 1, wherein the signal comprises at least one of a Zadoff-Chu sequence, a pseudo-noise sequence, a maximum length sequence, a static message used by a plurality of devices, an indication of an identity, an indication of a schedule, an indication of a capability, an indication of a state, an indication of a discovery mode of a receiving device, or a combination thereof.

22. A method for wireless communication, comprising:
monitoring for a plurality of discovery preambles using a plurality of receive beams as part of a beam sweeping procedure;
receiving a discovery preamble of the plurality of discovery preambles using a receive beam of the plurality of receive beams based at least in part on the monitoring, wherein the discovery preamble indicates an upcoming transmission of a discovery message;
receiving the discovery message using the receive beam; and
transmitting a signal in response to the discovery preamble or the discovery message using a transmit beam corresponding to the receive beam.

23. The method of claim 22, wherein a first frequency of discovery preamble transmissions is greater than a second frequency of discovery message transmissions.

24. The method of claim 22, wherein transmitting the signal comprises:
transmitting a query signal in response to the discovery preamble or transmitting an acknowledgment signal in response to the discovery message, or transmitting both the query signal and the acknowledgment signal in response to the discovery message, wherein the discovery message is received based at least in part on transmitting the query signal, and wherein the acknowledgment signal acknowledges receipt of the discovery message.

25. The method of claim 24, further comprising:
performing one or more actions based at least in part on the acknowledgment signal, the one or more actions comprising at least one of terminating the beam sweeping procedure, adjusting the beam sweeping procedure for subsequent receptions of discovery preambles and discovery messages, configuring subsequent communications, or any combination thereof.

26. The method of claim 22, further comprising:
monitoring for a first plurality of discovery preambles using a plurality of receive beams in a first transmission burst, wherein each discovery preamble in the first plurality of discovery preambles is transmitted using a first transmit beam; and
monitoring for a second plurality of discovery preambles using the plurality of receive beams in a second transmission burst, wherein each discovery preamble in the second plurality of discovery preambles is transmitted using a second transmit beam.

27. The method of claim 26, further comprising:
identifying a first receive beam of the plurality of receive beams for receiving a first discovery message after the first transmission burst, wherein the first receive beam is identified based at least in part on monitoring for the first plurality of discovery preambles using the plurality of receive beams; and
receiving the first discovery message after the first transmission burst using the first receive beam.

28. The method of claim 27, further comprising:
determining that a quality of the first discovery message is below a signal quality threshold; and
avoiding transmitting an acknowledgment signal in response to the first discovery message.

29. An apparatus for wireless communication, comprising: a processor; memory in electronic communication with the processor; and instructions stored in the memory and executable by the processor to cause the apparatus to:
generate a discovery preamble and a discovery message to broadcast in a device discovery procedure;
transmit the discovery preamble using a transmit beam as part of a beam sweeping procedure, wherein the discovery preamble indicates an upcoming transmission of the discovery message;
receive a signal in response to the discovery preamble or the discovery message; and
transmit the discovery message based at least in part on the transmitting the discovery preamble.

30. An apparatus for wireless communication, comprising: a processor; memory in electronic communication with the processor; and instructions stored in the memory and executable by the processor to cause the apparatus to:
monitor for a plurality of discovery preambles using a plurality of receive beams as part of a beam sweeping procedure;
receive a discovery preamble of the plurality of discovery preambles using a receive beam of the plurality of receive beams based at least in part on the monitoring, wherein the discovery preamble indicates an upcoming transmission of a discovery message;
receive the discovery message using the receive beam; and
transmit a signal in response to the discovery preamble or the discovery message using a transmit beam corresponding to the receive beam.

* * * * *